United States Patent [19]

Noaki

[11] Patent Number: 5,504,506
[45] Date of Patent: Apr. 2, 1996

[54] INFORMATION RECORDING METHOD CAPABLE OF PERFORMING A HIGH QUALITY RECORDING IN ACCORDANCE WITH PRINTING CONDITIONS

[75] Inventor: Hiroaki Noaki, Chiba, Japan

[73] Assignee: Canon Kabushiki Kaisha, Tokyo, Japan

[21] Appl. No.: 161,861

[22] Filed: Dec. 6, 1993

Related U.S. Application Data

[63] Continuation of Ser. No. 764,198, Sep. 23, 1991, abandoned.

[30] Foreign Application Priority Data

Sep. 25, 1990 [JP] Japan .................................. 2-256097

[51] Int. Cl.⁶ ........................................................ B41J 2/01
[52] U.S. Cl. ................................................. 347/16; 347/14
[58] Field of Search ............................ 347/5, 9, 14, 16, 347/19, 104; 395/102, 101

[56] References Cited

U.S. PATENT DOCUMENTS

| 4,087,825 | 5/1978 | Chen | 349/15 |
|---|---|---|---|
| 4,216,480 | 8/1980 | Buehner | 347/37 |
| 4,313,124 | 1/1982 | Hara . | |
| 4,345,262 | 8/1982 | Shirato et al. . | |
| 4,439,775 | 3/1984 | Johnson | 347/37 |
| 4,459,600 | 7/1984 | Sato et al. . | |
| 4,463,359 | 7/1984 | Ayata et al. . | |
| 4,558,333 | 12/1985 | Sugitani et al. . | |
| 4,617,580 | 10/1986 | Miyakawa | 347/14 X |
| 4,631,548 | 12/1986 | Milbrandt | 347/15 X |
| 4,718,040 | 1/1988 | Ayata | 564/700 |
| 4,723,129 | 2/1988 | Endo et al. . | |
| 4,740,796 | 4/1988 | Endo et al. . | |
| 4,866,462 | 9/1989 | Watanabe | 347/9 |
| 5,093,903 | 3/1992 | Sudoh | 395/102 |
| 5,237,344 | 8/1993 | Tasaki | 347/9 |

FOREIGN PATENT DOCUMENTS

| 0317740 | 5/1989 | European Pat. Off. | B41J 3/02 |
|---|---|---|---|
| 146769 | 11/1981 | Japan | B41J 3/04 |
| 58-162349 | 9/1983 | Japan | B41J 3/00 |
| 59-123670 | 7/1984 | Japan | B41J 3/04 |
| 59-138461 | 8/1984 | Japan | B41J 3/04 |
| 60-110459 | 6/1985 | Japan | B41J 3/04 |
| 61-290060 | 12/1986 | Japan | B41J 3/04 |

*Primary Examiner*—Joseph W. Hartary
*Attorney, Agent, or Firm*—Fitzpatrick, Cella, Harper & Scinto

[57] ABSTRACT

An information recording method comprises the steps of storing image information, judging the printing conditions related to the printing quality, changing the dot pattern which is utilized for the formation of the stored image information on a recording medium from the stored dot pattern in the case where the printing conditions are judged by the aforesaid judgment to degrade the printing quality, and storing the image information by the dot pattern thus changed, hence making it possible to implement a high quality printing of illustrations, and others suited for the quality of papers used, ambient conditions, object printing data, and the type of object printers.

9 Claims, 28 Drawing Sheets

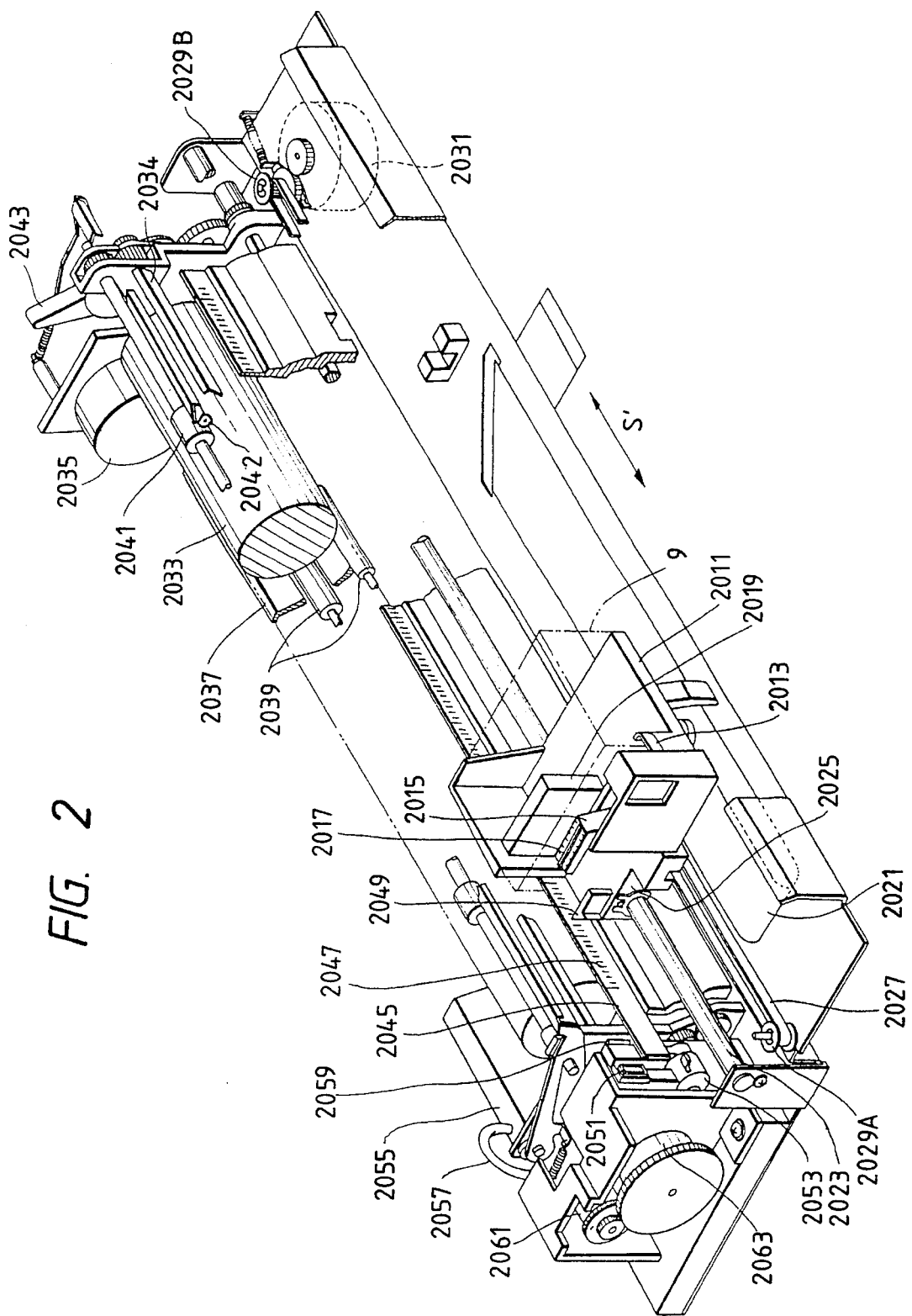

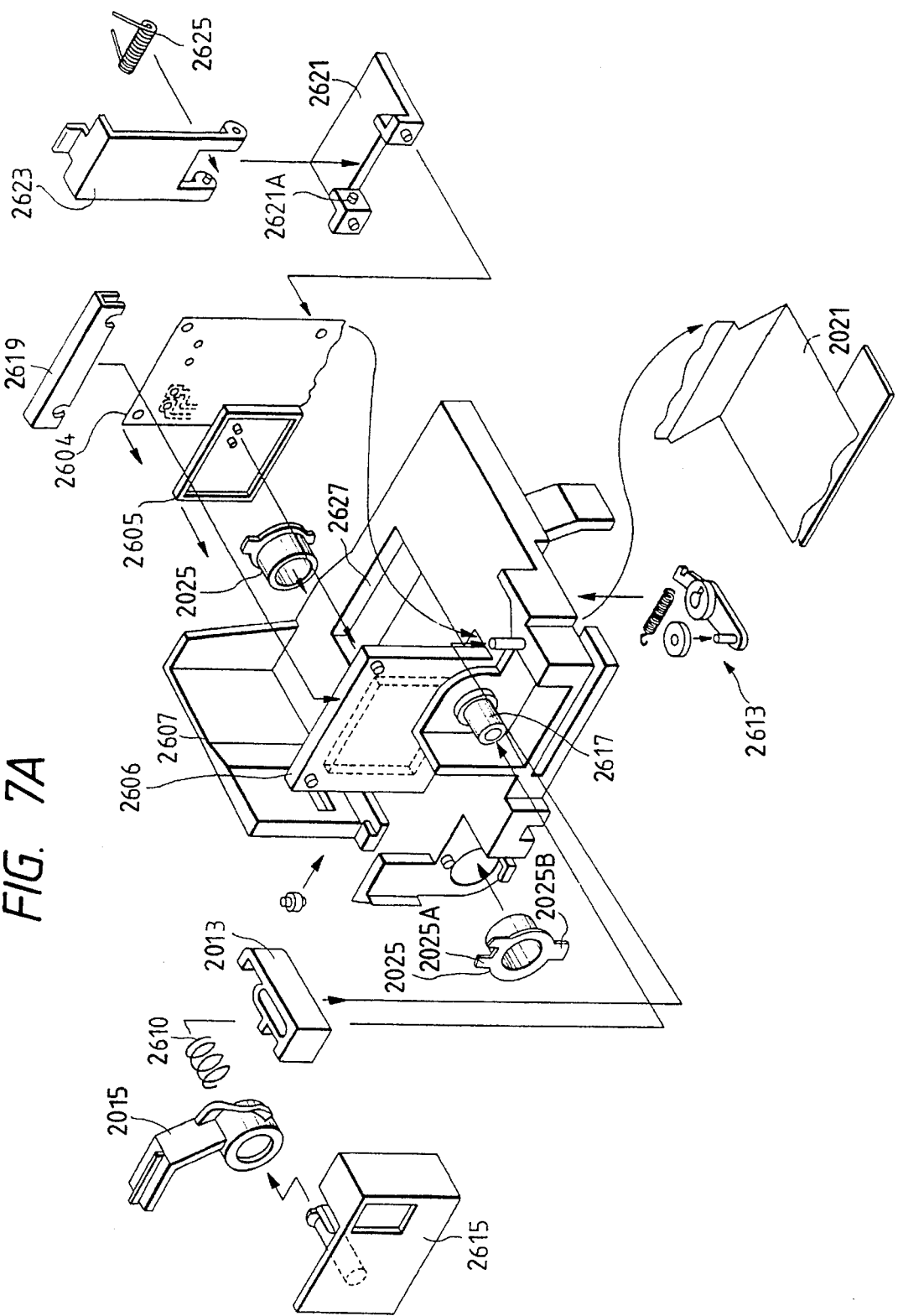

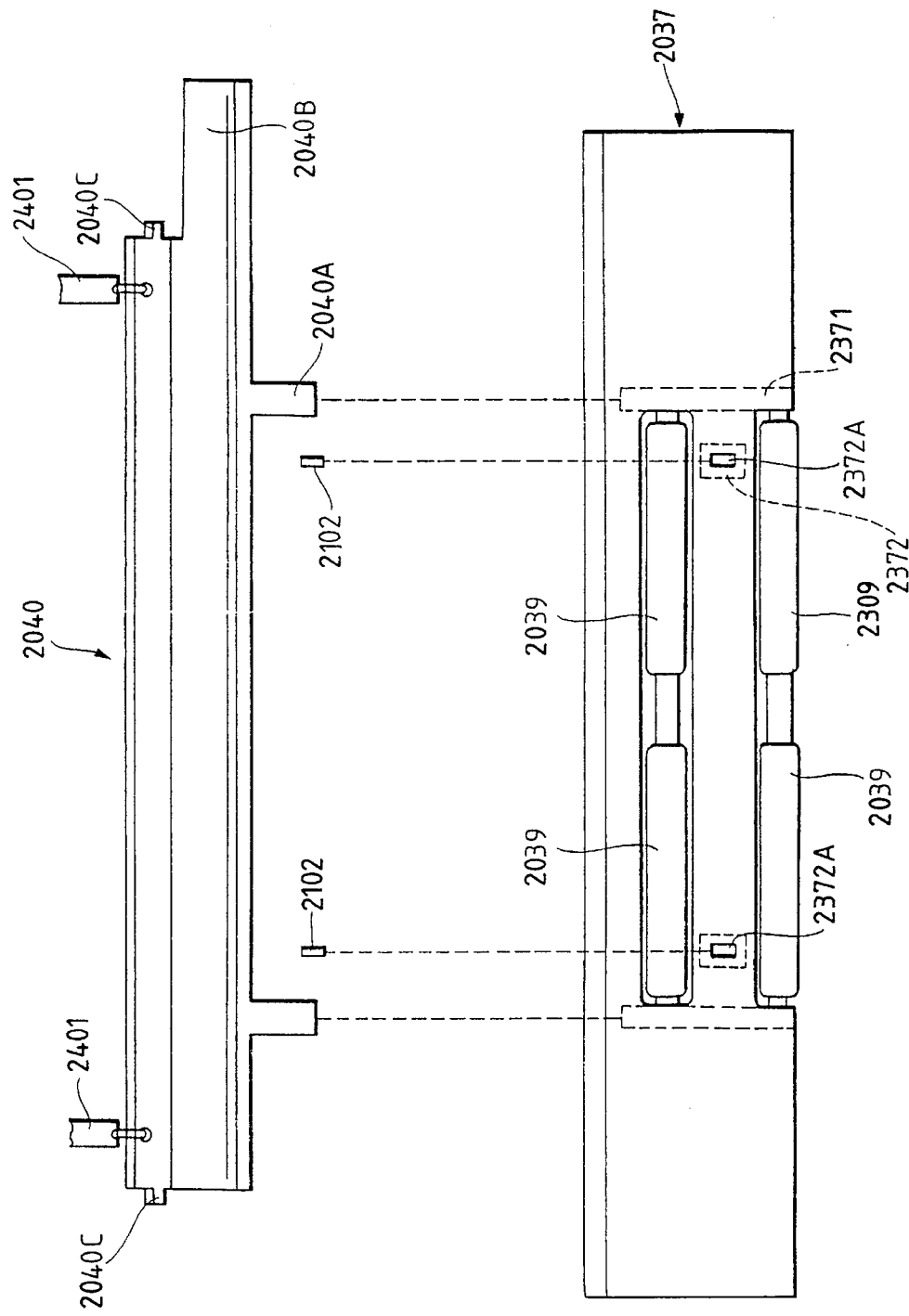

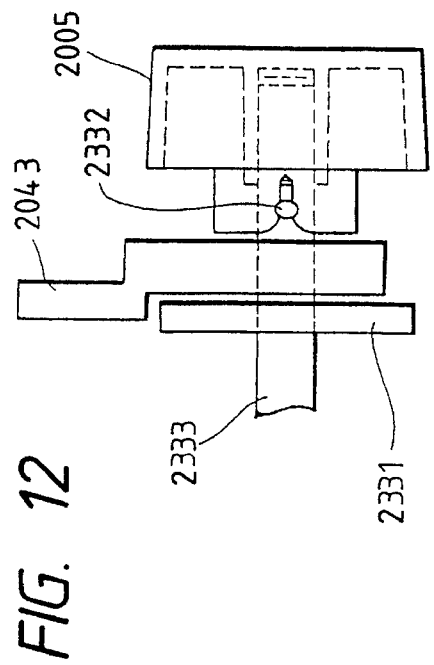
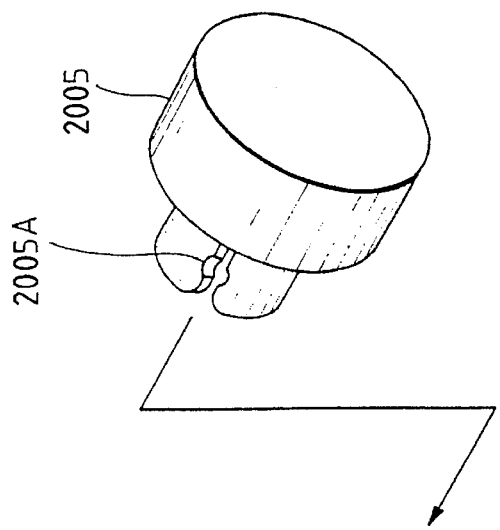
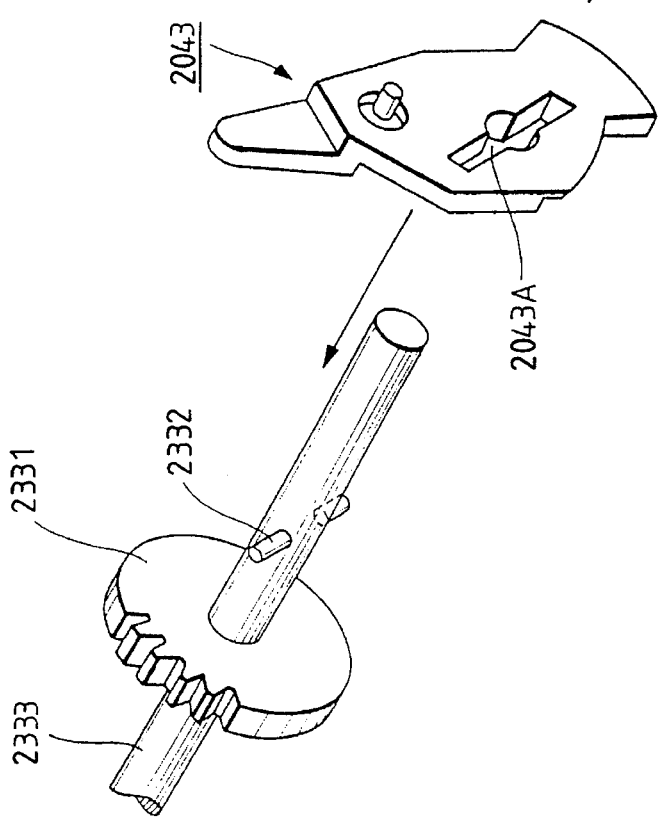
FIG. 12
FIG. 13

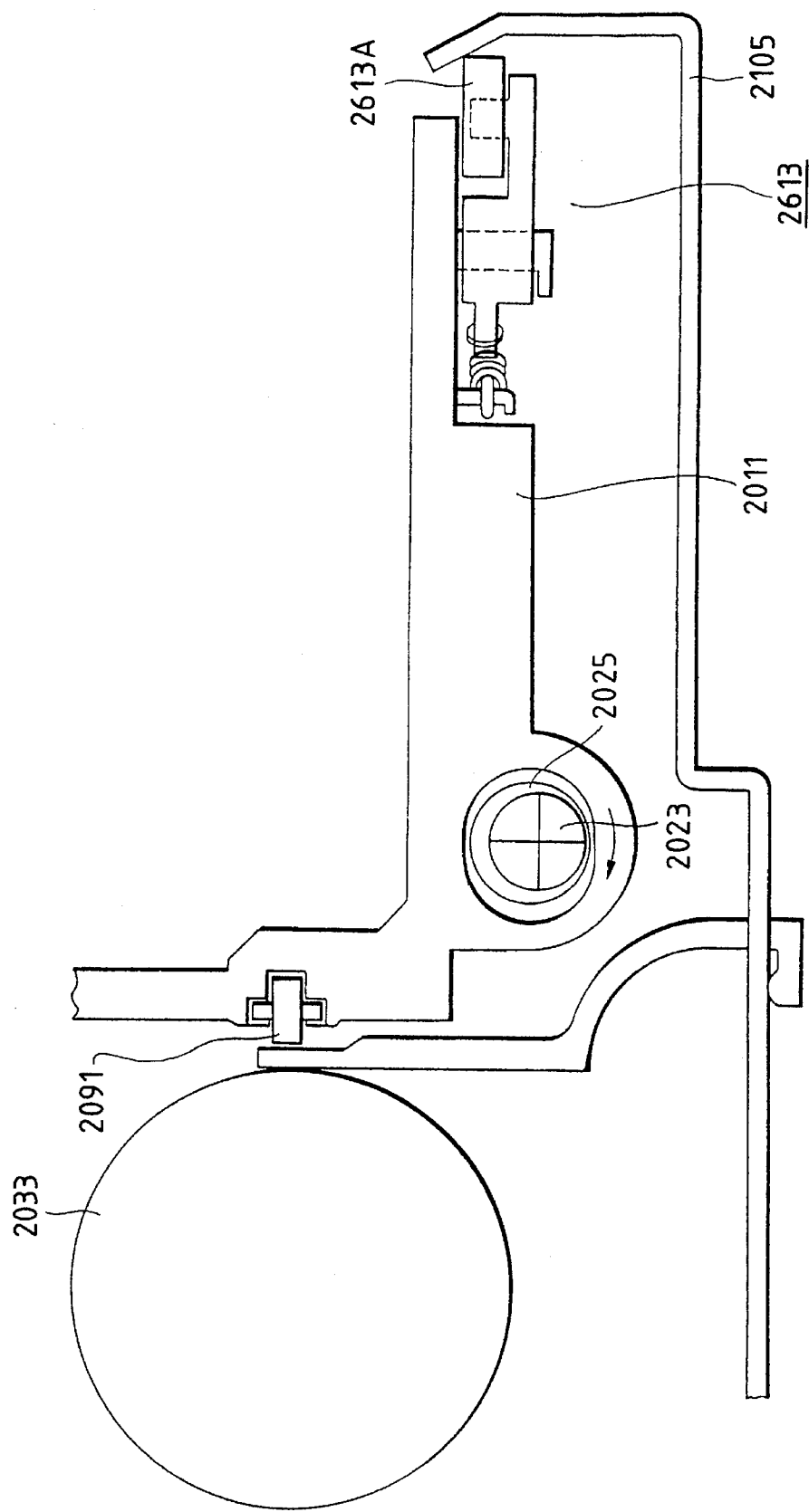

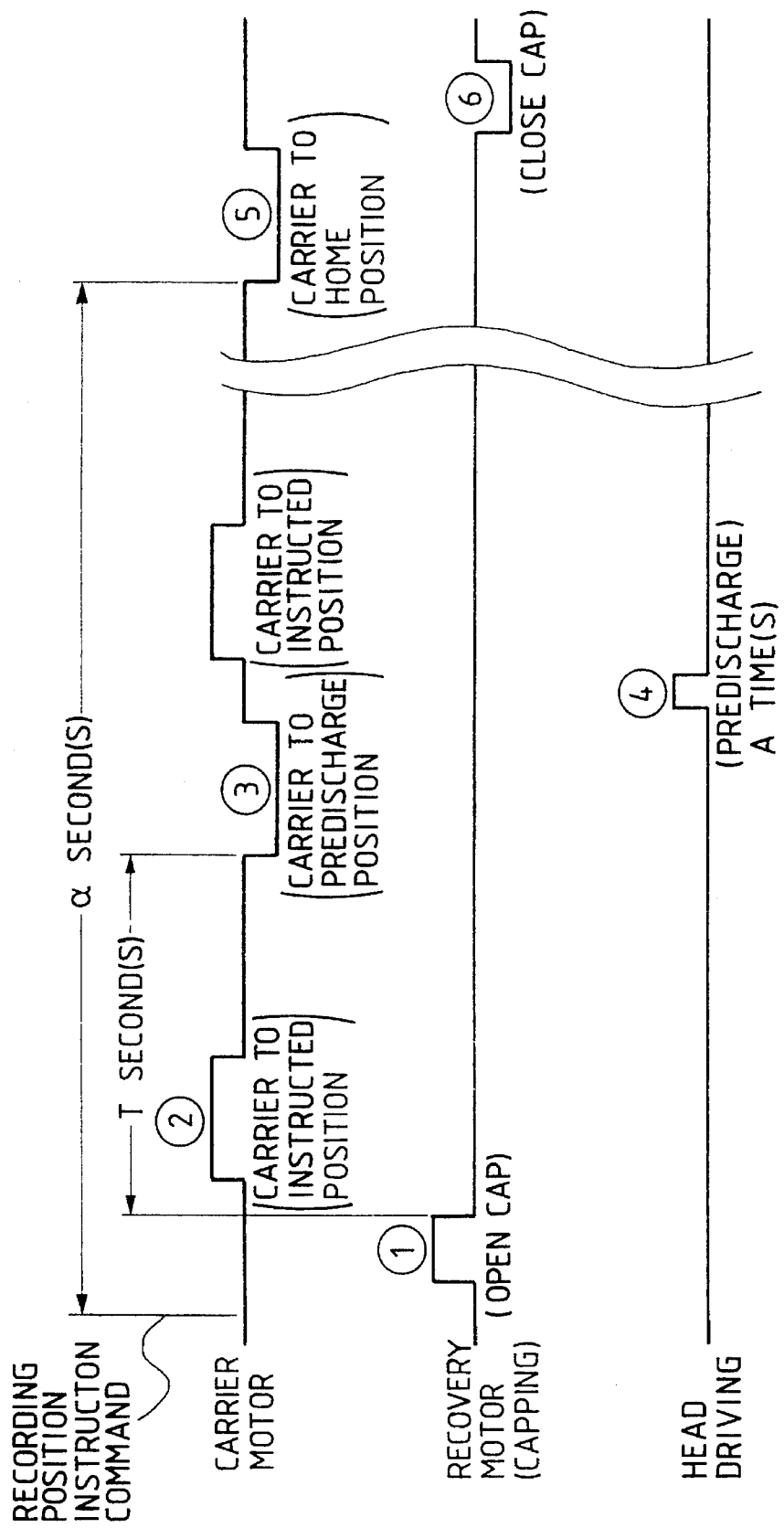

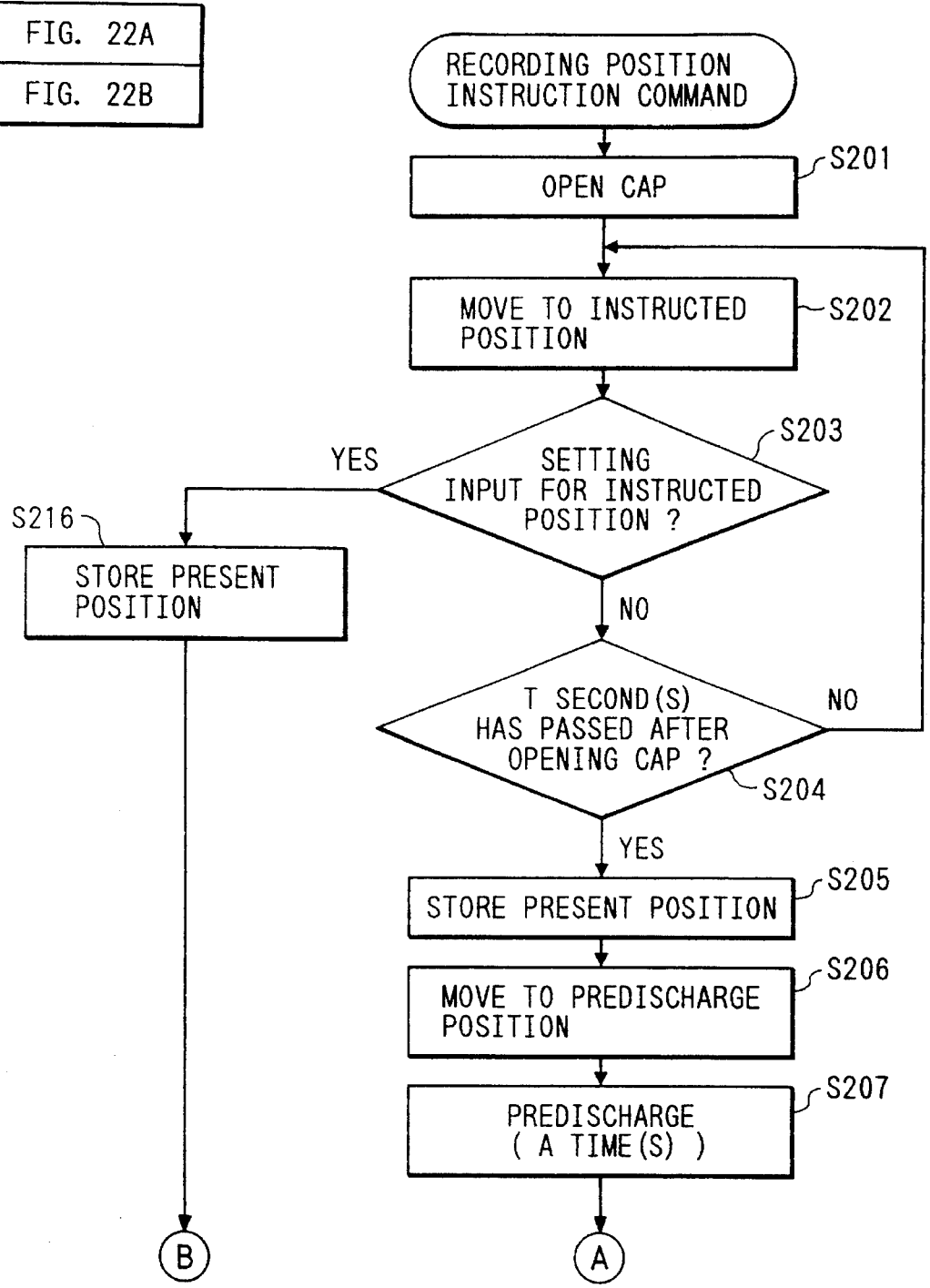

FIG. 27A
FIG. 27B
FIG. 28A
FIG. 28B
FIG. 29A
FIG. 29B

INFORMATION RECORDING METHOD CAPABLE OF PERFORMING A HIGH QUALITY RECORDING IN ACCORDANCE WITH PRINTING CONDITIONS

This application is a continuation of application Ser. No. 07/764,198 filed Sep. 23, 1991, now abandoned.

BACKGROUND OF THE INVENTION

1. Field of the Invention

The present invention relates to a recording method for an information processing apparatus for performing an recording while implementing the improvement of the printing quality in accordance with the various conditions.

2. Related Background Art

Traditionally, for a recording apparatus to perform the recording on paper, OHP sheet, or other recording media (hereinafter referred to simply as paper as the output unit for an information processing apparatus, a wire-dot method, thermosensitive method, thermal transfer method, ink jet method, and various other recording methods have been proposed.

Particularly, the ink jet method has been of interest to those who are in the art as a quiet recording method with a low running cost because this method allows ink to be discharged directly onto the recording paper.

The ink jet recording apparatus has traditionally been such that dot patterns are formed on a recording paper by driving a plurality of dot formation elements provided on the recording head selectively in accordance with recording information (image data). The solid printing area of the character or image data such as shown in FIGS. 27A and 27B are filled with dot patterns as recording information for this recording apparatus.

However, a conventional example such as this has a drawback that as shown in FIGS. 28A and 28B, the printing quality in the solid printing area on the recording sheet is degraded because of the kind of the printing sheet used, the ambient conditions at the time of the apparatus used, the irregularity generated in the recording head, and the like.

(1) The effect caused by the kinds of recording sheets (difference between them).

According to the kinds of recording sheets, there is difference in the absorptions and fixations of ink when the ink droplets discharged from the nozzles of the recording head have arrived at the printing surface of the recording sheet. Thus, if the absorption and fixation of ink are inferior, the resultant irregularity of density occurs in the solid printing area by the difference in dot sizes. Also, featherings occur.

(2) The effect cased by the ambient conditions at the time of the recording apparatus used.

By the ambient temperature and other factors, the quantity of ink droplets discharged from the nozzles of the recording head varies. Consequently, irregular densities are generated in the solid printing area, which further leads to the printing slippage, splash, satellite, or the like.

(3) The effect caused by the irregularity generated in the recording head.

Due to the irregularity generated in the recording head when manufactured, the degradation of the printing quality results in a solid printing area when the recording is performed.

SUMMARY OF THE INVENTION

An object of the present invention is to provide an information processing apparatus capable of executing the printing with an appropriate printing quality in accordance with the printing conditions.

Another object of the present invention is to provide an information processing apparatus capable of executing the printing by improving the printing quality in the solid printing area.

Still another object of the present invention is to provide an information processing apparatus capable of implementing the improvement of the printing quality by changing the dot patterns for those effecting the degradation in a case where the printing quality is being degraded.

A further object of the present invention is to provide an information processing apparatus capable of executing the printing by improving the printing quality in accordance with the material of the printing medium.

According to one aspect, the present invention which achieves these objectives relates to an information recording method comprising the steps of:

storing image information;

judging the printing conditions related to the printing quality;

changing the dot pattern which is utilized for the formation of the aforesaid stored image information on a recording medium from the stored dot pattern in the case where the printing conditions are judged by the aforesaid judgment to degrade the printing quality; and storing the aforesaid image information by the changed dot patterns.

According to another aspect, the present invention which achieves these objectives relates to an information recording method comprising the steps of:

storing image information;

defining the size of a recording medium;

judging the material of the recording medium on the basis of the aforesaid defined size; and storing the aforesaid image information by the control corresponding to the aforesaid judged material.

Other objectives and advantages besides those discussed above shall be apparent to those skilled in the art from the description of a preferred embodiment of the invention which follows. In the description, reference is made to accompanying drawings, which form a part hereof, and which illustrates an example of the invention. Such example, however, is not exhaustive of the various embodiments of the invention, and therefore reference is made to the claims which follow the description for determinating the scope of the invention.

BRIEF DESCRIPTION OF THE DRAWINGS

FIG. 2 is a perspective view showing one example of a printer portion of an ink jet recording apparatus.

FIGS. 7A, 7B and 7C are an exploded perspective view of the above mentioned carriage, a side view of the same carriage, and a side view showing a state where the head cartridge is mounted on the carriage, respectively.

FIGS. 8A and 8B are cross-sectional side and exploded upper views of a recording medium conveying system of the printer as shown in FIG. 2, respectively.

FIG. 12 is a typical front view showing an engaged state between a lever and a knob for releasing the above mentioned energizing.

FIG. 13 is an exploded perspective view of the mechanism as shown in FIG. 14.

FIG. 17 is a typical side view for explanation of the change of a guide bearing accompanied by the above mentioned change.

FIG. 21 and FIGS. 22, 22A, 22B are a timing chart and a flowchart in a recording position instructed mode for the recording apparatus as shown in FIG. 2, respectively.

FIGS. 27A and 27B are views showing the examples of characters and image including solid printing portions.

FIGS. 28A and 28B are views showing the examples of printing outputs of characters and image having density irregularities.

FIGS. 29A and 29B are views showing the examples of printing outputs of characters and image by substitute patterns.

DETAILED DESCRIPTION OF THE PREFERRED EMBODIMENTS

[The Structure and Operation of An Ink Jet Recording Apparatus]

Figure 1A:
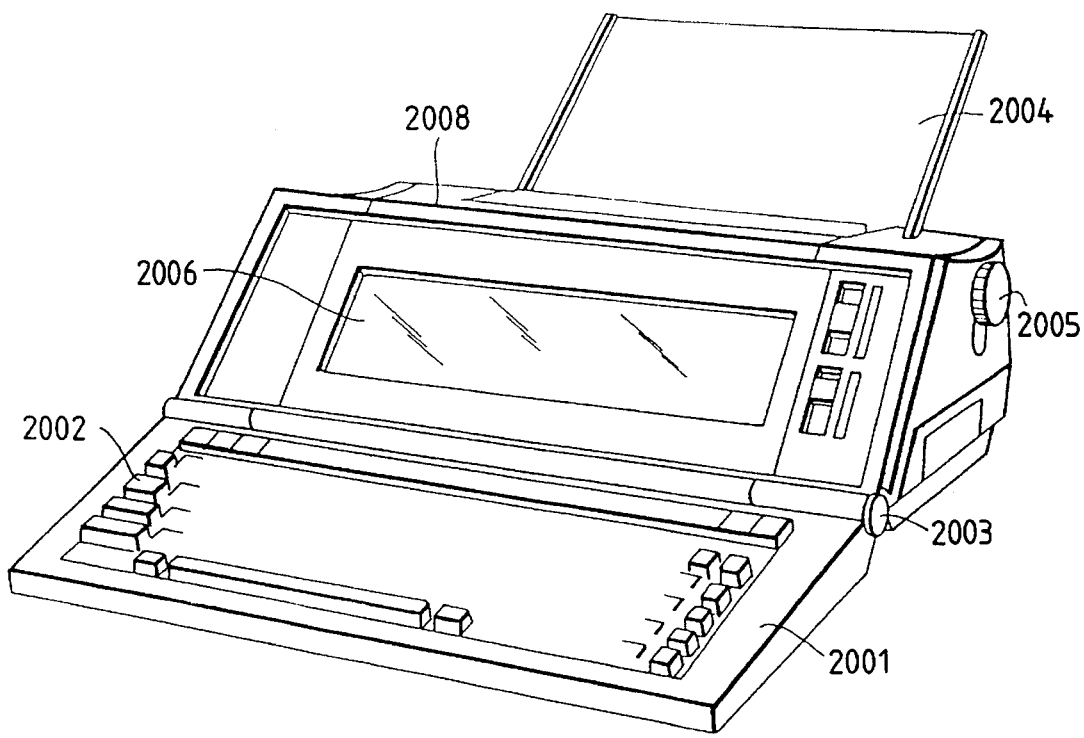
FIGS. 1A and 1B are perspective views showing a configuration of a word processor as one example of a device to which the present invention is applied.
Figure 1B:
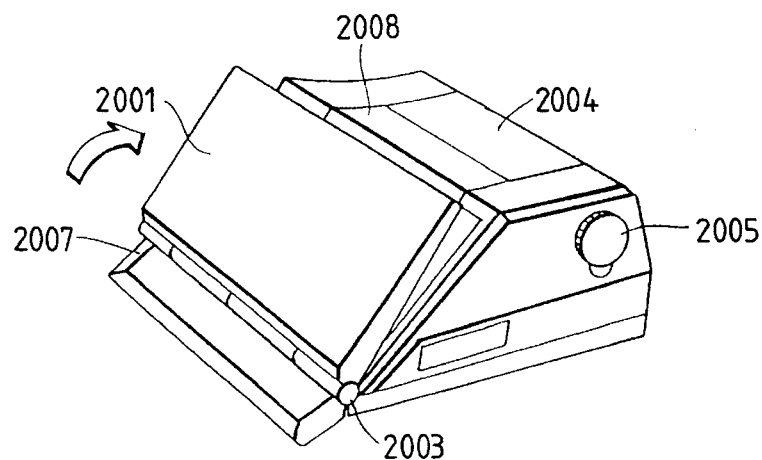

FIGS. 1A and 1B show perspective views of an electronic typewriter with another device to which this invention is applicable.

2001 is a keyboard, in which there is arranged a group of keys 2002, such as keys for entering characters, e.g. letters and numerals, and control keys. When it is not used, the device can be folded by turning it around a hinge 2003, as shown in FIG. 21B. 2004 is a feed paper tray for feeding a sheet-like recording medium onto a printer section within the apparatus, and can be also stored by folding over the printer section, as shown in FIG. 24B, when not used. 2005 is a feeder knob for setting or exhausting the recording medium manually, 2006 is a display for displaying input sentences or other data, and 2007 is a handle used to transport the apparatus in accordance with this invention.

2008 is a window constituting a cover for the electronic typewriter in accordance with this example, and provided on an upper portion of the typewriter adjacent to the display 2006, which enables a visual inspection of an ink jet printer and a recording medium that are accommodated therein, as will be described later.

FIG. 2 shows a construction of a printer section according to this example.

9 is a head cartridge having an ink jet recording head, and 2011 is a carriage for scanning in the S' direction in the figure with the head cartridge 9 mounted thereon. 2013 is a hook for attaching the head cartridge 9 onto the carriage 2011, and 2015 is a lever for operating the hook 2013. On this lever 2015 is provided a marker 2017 for enabling a print or set position of the recording head of the head cartridge to be read relative to a scale provided on the cover as described later. 2019 is a support plate for supporting an electrical connection to the head cartridge 9. 2021 is a flexible cable for connecting between its electrical connection and a control section of main body.

2023 is a guide shaft for guiding the carriage 2011 in the S direction, which is inserted through bearings 2025 of the carriage 2011. 2027 is a timing belt for transmitting a power to move the carriage 2011 fixed thereto in the S direction, passing under tension about pulleys 2029A, 2029B arranged on both sides of the apparatus. A driving force is transmitted to one pulley 2029B via a transmission, e.g. a gear, from a carriage motor 2031.

2033 is a conveying roller for conveying a recording medium, e.g. a paper (thereafter referred to as a recording paper) in recording, as well as regulating a record face of the recording medium, and it is driven by a conveying motor 2035. 2037 is a paper pan for guiding the recording medium from the feed paper tray 2004 to a recording position, and 2039 are feed rollers, disposed on a way of feed path for the recording medium, for biasing the recording medium against the conveying roller 2033 to convey it. 2034 is a platen for regulating a record face of the recording medium, opposed to discharge ports of the head cartridge 2009. 2041 is a paper exhausting roller for exhausting the recording medium to a paper exhausting port, not shown, which is disposed downstream from the recording position in the direction of conveying the recording medium. 2042 is a spur provided correspondingly to the paper exhausting roller 2041, for pressing the roller 2041 via the recording medium, and developing a force for conveying the recording medium with the paper exhausting roller 2041. 2043 is a release lever for releasing the energizing state for a feed roller 2039, a presser bar 2045, and a spur 2042, when setting the recording medium.

2045 is a presser bar for suppressing the floating of a recording medium in a neighborhood of a recording position to secure a tight contact condition against the conveying roller 2033. In this example, an ink jet recording head to record with the discharge of ink is used. Accordingly, as a distance between an ink discharge port formation face of the recording head and a record face of the recording medium is relatively slight, and must be strictly controlled to avoid a contact between them, the presser bar 2045 is effectively disposed. 2047 is a scale provided on the presser bar 2045, and 2049 is a marker provided on the carriage 2011 correspondingly to this scale, both enabling a print or set position for the recording head to be read.

2051 is a cap made of an elastic material, e.g. rubber, which is placed opposite to an ink discharge port formation face of the recording head in a home position, and supported therein to be able to attach to/detach from the recording head. The cap 2051 is used for protecting the recording head when it is not used, or in a suction recovery processing for the recording head. The suction recovery process is such a processing that the cap 2051 is opposed to the discharge port formation face, and the ink is discharged from the whole discharge ports by driving energy generation elements for the ink discharge provided inwardly of the ink discharge ports, thereby discharge faulty factors, such as bubbles, dusts, or thickened ink not suitable for recording are removed (predischarge), or otherwise, discharge faulty factors are removed by forcedly discharging the ink from the discharge ports, with the discharge port formation face being covered with the cap 2051.

2053 is a pump used to generate a suction force for the forced discharge of ink, and to suck the ink received within the cap 2051 in the suction recovery process with the forced discharge or predischarge. 2055 is a waste ink tank for reserving waste ink sucked by the pump 2053, and 2057 is a tube for communicating between the pump 2053 and the waste ink tank 2055.

2059 is a blade for wiping the discharge port formation face of the recording head, which is movably held between a position for wiping during the movement of head by projecting onto the recording head, and a retracted position not engaging the discharge port formation face. 2061 is a motor, and 2063 is a cam mechanism for driving the pump 2053 and moving the cap 2051 and the blade 2059, with the power transmitted from the motor 2061.

Next, the above mentioned head cartridge 9 will be described in detail.

Figure 3:
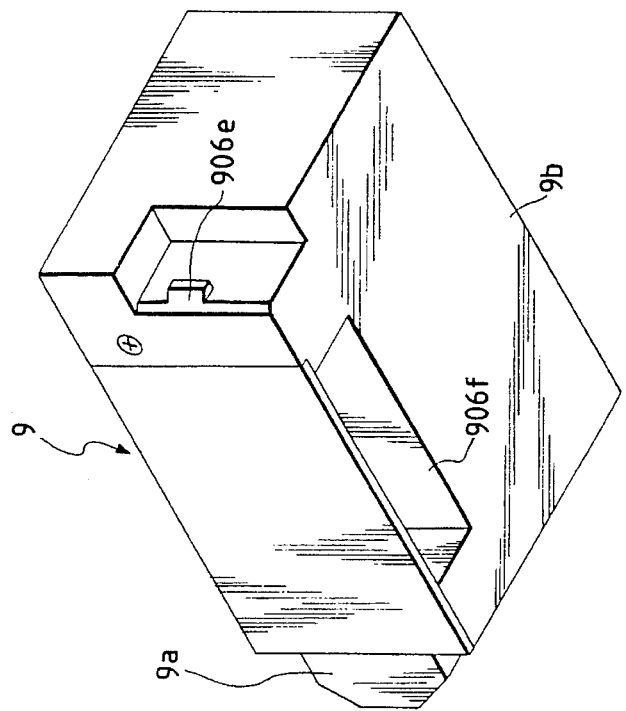
FIG. 3 is an external perspective view of a head cartridge as shown in FIG. 2.

FIG. 3 shows a perspective view of the head cartridge 9 integral with a discharge unit 9a that is an ink jet recording head body and an ink tank 9b, where 906e is a click engaged by a hook 13 on the carriage 11 in attaching the head cartridge 9. As clearly shown, the click 906e is disposed within a whole extension of the recording head. And near the discharge unit 9a in front of the head cartridge 9 is provided an abutting portion for positioning, not shown. 906f is a head opening section into which a support plate provided on the carriage 11 for supporting a flexible substrate (electrical connection portion) and rubber pad is inserted.

Figure 4B:
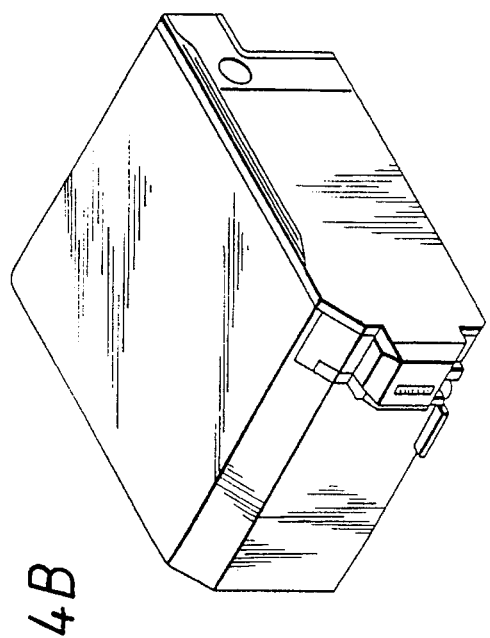
FIGS. 4A and 4B are an exploded perspective view and an external perspective view of the head cartridge as shown in FIG. 3, respectively.
Figure 4C:
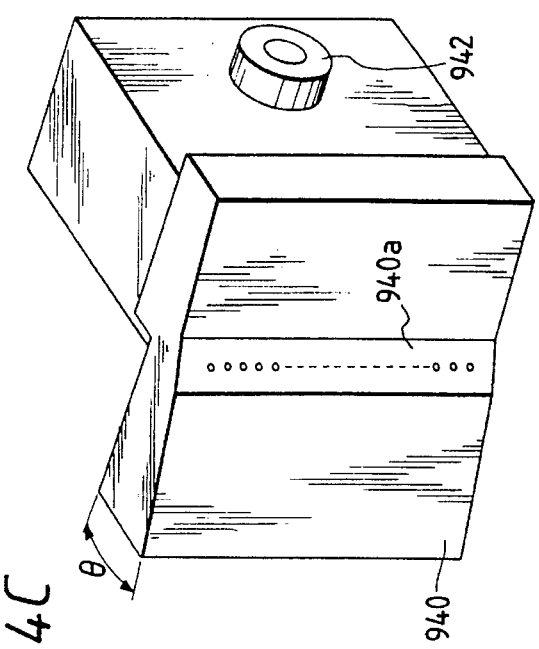
FIG. 4C is a perspective view showing a configuration example of a recording head roof plate as shown in FIG. 4A.
Figure 4A:
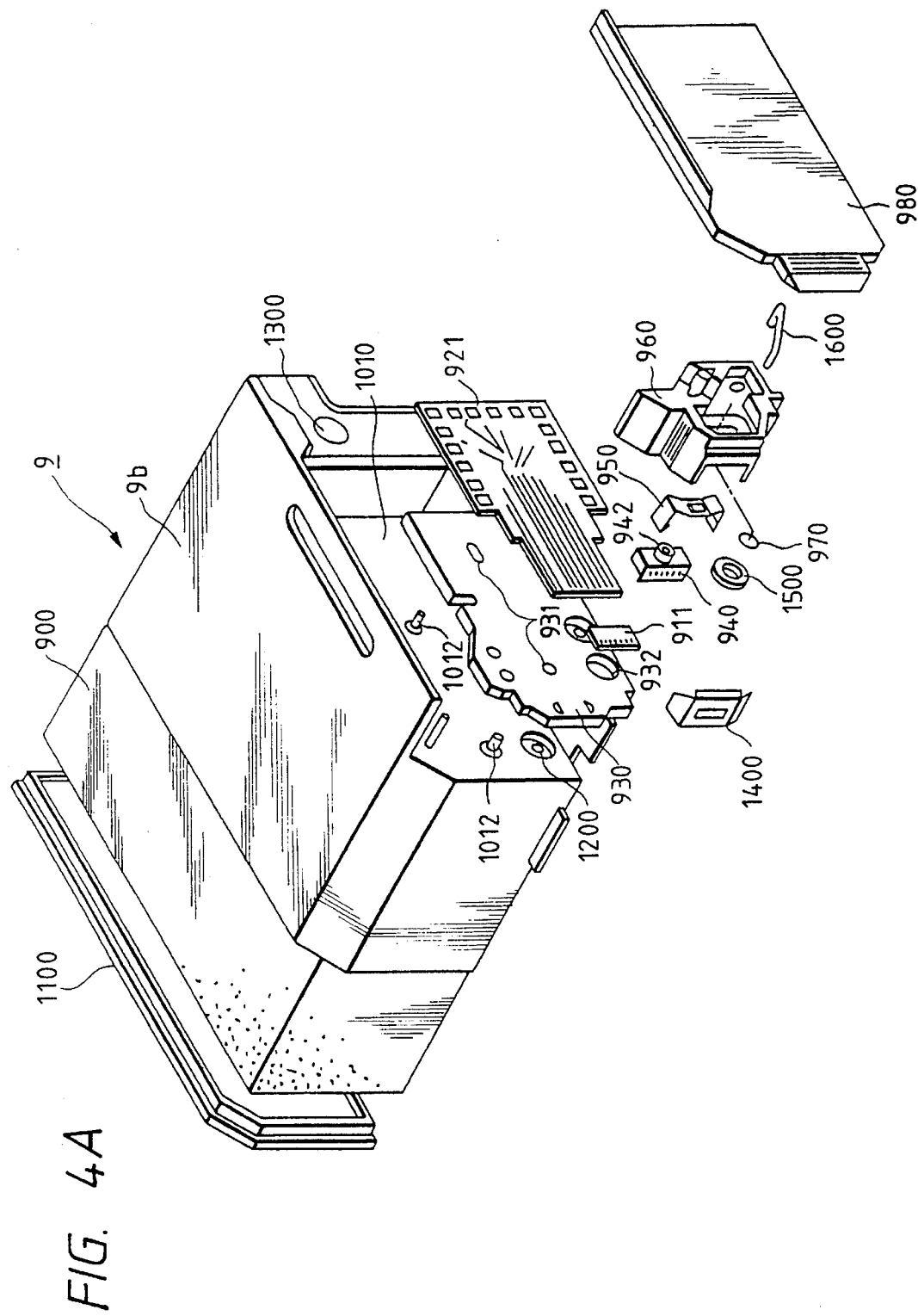

FIGS. 4A and 4B show exploded perspective views of the head cartridge as shown in FIG. 3, which is of a disposable type integrated with an ink storage section which is a supply source of ink, as described above.

In the same figure, 911 is a heater board comprising an electricity heat conversion element (discharge heater) and a wiring made of Al or the like for supplying the electric power to it, which are formed on a Si substrate with the film technique. 921 is a wiring substrate for the heater board, the corresponding wirings being connected in a wire bonding method, for example.

940 is a roof plate provided with a diaphragm for restricting an ink flow path and a common liquid chamber, made of a resin material integrated with an orifice plate section in this embodiment. As shown in FIG. 4C, the discharge port formation face is inclined by a predetermined angle θ with respect to a plane parallel to a record face of recording paper, and has a step 940a in the vicinity of discharge ports. This was made correspondingly to a predetermined angle between a flow path within an orifice plate portion and a back flow path therefrom, for the machining of the discharge ports which are radiated with a laser beam from the flow path provided on the roof plate.

930 is a carrier made of, for example, metal, and 950 is a presser spring, between which are engagingly carried the heater board 911 and the roof plate 940, to thereby tightly fix them with an energizing force of the presser spring 950. It should be noted that the carrier 930 is pasted with the wiring substrate 921, and has a positioning reference to the carriage 11 for scanning with the head. The carrier 930 also functions as a cooling member for radiating the heat on the heater board 911 generated by driving.

960 is a supply tank, which functions as a subtank for receiving ink from an ink storage 9b which is an ink supply source and for conducting ink into the common liquid chamber formed by the joint of the heater board 911 and the roof plate 940. 970 is a filter disposed in a position within the supply tank 960 near an ink supply port into the common liquid chamber, and 980 is a lid member for the supply tank 960.

900 is an absorbing member for being impregnated with ink, disposed within the ink tank body 9b. 1200 is a supply port for supplying the ink to a discharge unit 9a comprising each of portions 911–980 as above indicated, for allowing the impregnation of ink into the absorbing member 900 by injecting the ink through the supply port 1200, in a process before this unit is placed on a portion 1010 of the ink tank body 9b.

1100 is a lid member for the cartridge body, and 1300 is an atmosphere communicating port provided on the lid member for communicating the inside of the cartridge to the atmosphere.

After the ink has been filled via the supply port 1200 into the ink tank 9b, the discharge unit 9a consisting of each of the portions 911–980 is positioned and disposed on the portion 1010. The positioning or fixing at this time can be performed, for example, by fitting a projection 1012 on the ink tank body 9b into a corresponding hole 931 on the carrier 930, thereby resulting in the complete head cartridge 9 as shown in FIG. 4B.

And the ink is supplied from the inside of the cartridge through a supply port 1200, a hole 932 on the carrier 930 and an inlet port on the back side of the supply tank 960 as shown in FIG. 4A into the supply tank 960, and after passing through the inside of the supply tank 960, the ink flows out of an outlet port through an appropriate supply tube and an inlet port 942 on the roof plate 940 into the common liquid chamber. At the connections for communicating ink as indicated above, packings such as silicone rubber or butyl rubber are disposed, thereby sealing those connections to secure the ink supply path.

Figure 5A:
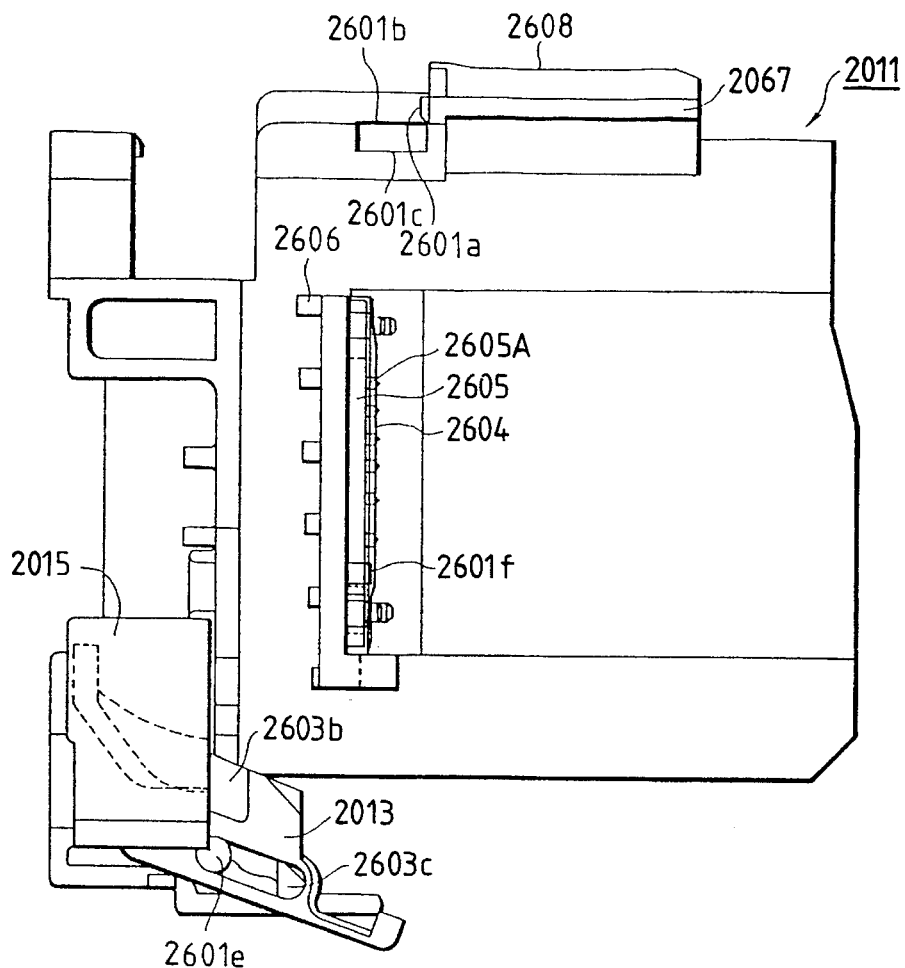
FIGS. 5A and 5B are upper and side views of a carriage as shown in FIG. 2.
Figure 5B:
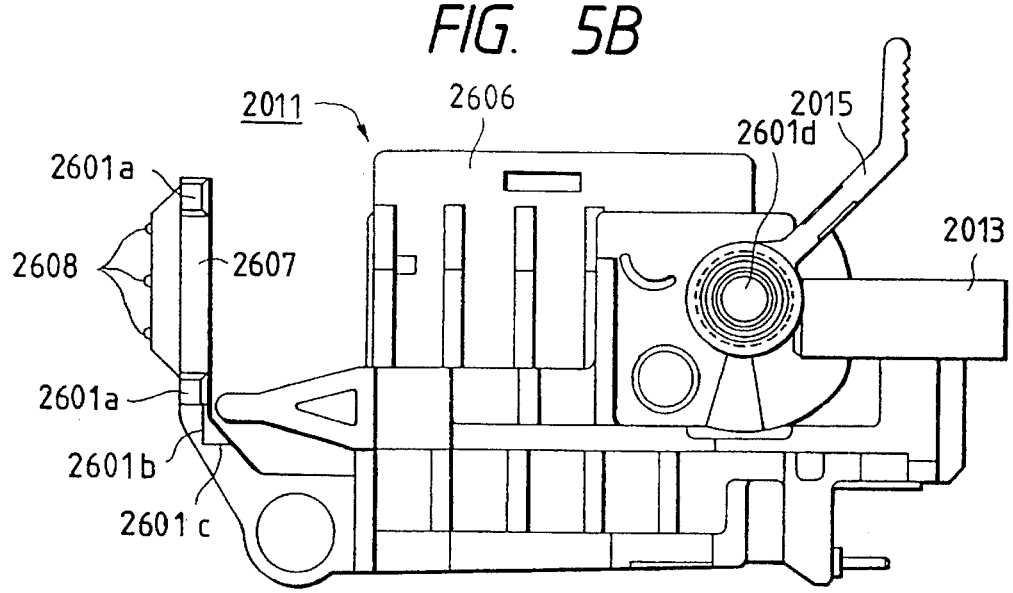

FIGS. 5A and 5B are upper and side views showing the carriage 2011 in detail, respectively.

2606 is a support plate provided on a bottom portion of the carriage 2011, for supporting a flexible substrate 2604 and a rubber pad 2605 having projection portions 2605A corresponding to terminal pads formed in the substrate 2604.

2607 is an abutting member which is also provided on the bottom portion in front of the carriage 2011. The abutting member 2607 is formed so that its wall thickness is thin, in order to preserve a maximum space for the of ink tank within a limited range of space for disposing both the head cartridge 2009 and the carriage 2011. Hence, on the member 2607 are formed three ribs 2608 to secure the strength thereof. The extending direction of the ribs 2608 is the movement direction of the carriage 2011 so as to have a sufficient strength to withstand the movement of the head cartridge in the swivel direction when it is detached. The ribs 2608 are formed to be about 0.1 mm forwardly of the discharge face when the head cartridge 2009 is attached. Thereby even when a recording paper protrudes toward the travel path of the recording head with any action, the recording paper is prevented from rubbing the discharge face and causing damage.

An operation lever 2015 for attaching or detaching the head cartridge freely rotatably bears on a shaft 2601d on the carriage body 2011. A hook 2013 is used, with the movement engaging with a portion of the operation lever 2015, to attach or detach the head cartridge 2009 which is partly in engagement with that operation lever 2015. The hook 2013 can perform the above mentioned attaching or detaching operation by guiding a long hole 2603c formed therein into a guide shaft 2601c on the carriage body 2011.

As the attaching or detaching mechanism consisting of the operation lever 2015 and the hook 2013 is provided laterally of the carriage 2011, or in the movement direction side of the carriage 2011, the attaching or detaching mechanism does not create any large dead space due to the movement of the carriage.

Next, an abutting portion used to position the head cartridge when attaching will be described.

2601a are abutting portions for positioning the head cartridge in the left and right directions, provided at two locations on the both sides of the abutting member 2607. It should be noted that for positioning the head cartridge in the left and right directions, an abutting portion 2601f on the support plate 2606 may be also used, in addition to the abutting portions 2601a.

2601b is an abutting portion to position the cartridge in the forward and backward directions, formed in a laterally underside portion of the abutting member 2607.

2601c is abutting portions to position the cartridge in the upper and lower directions, formed at two locations, i.e., in a laterally underside portion of the abutting member 2607 and a laterally underside portion of the support plate.

Figure 6A:
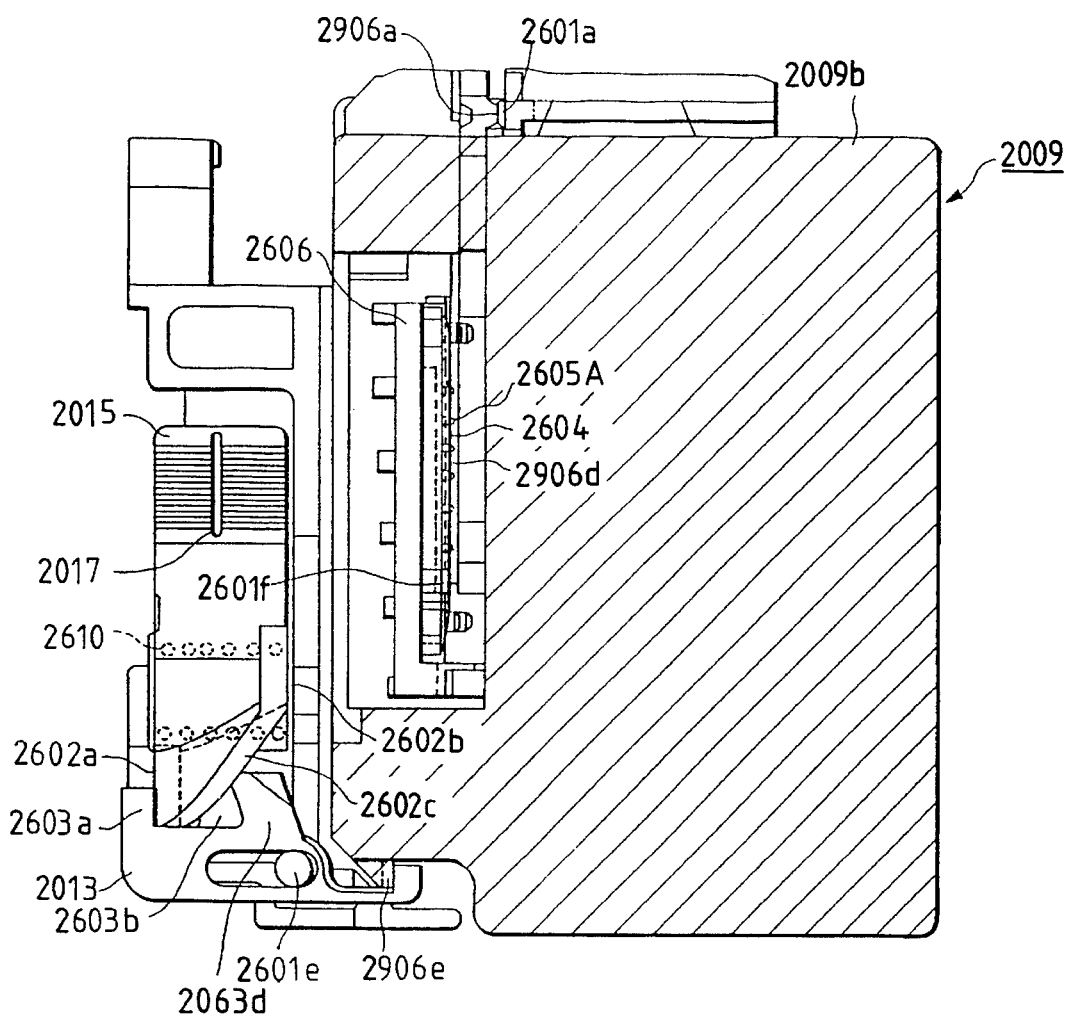
FIGS. 6A and 6B are upper and side views showing a state where the above mentioned head cartridge is mounted on the above mentioned carriage.
Figure 6B:
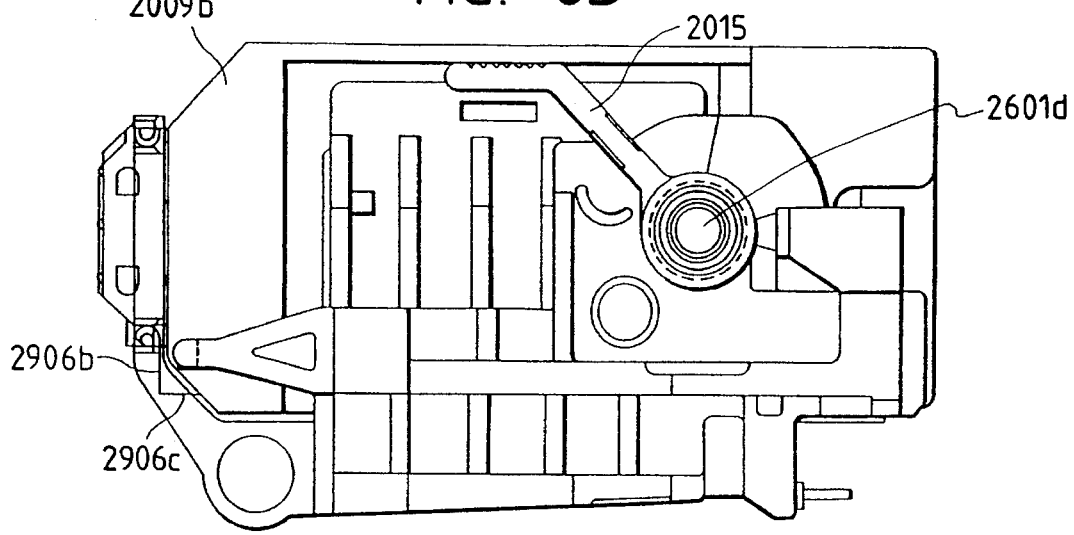

FIGS. 6A and 6B are upper and left side views showing the state when the head cartridge 2009 is attached onto the carriage 2011, respectively.

In these figures, 2906a is a direct contact portion provided on the head cartridge 2009 so as to come into direct contact with an abutting portion of the carriage 2011, when the recording head is attached, while 2906b and 2906c are also direct contact portions corresponding to the abutting portions 2601b and 2601c, respectively.

Referring now to FIG. 6A, the engagement relations between portions when the recording head is attached will be outlined.

The direct contact portion 2906a of the head cartridge 2009 is directly in contact with the abutting portion 2601a of the carriage 2006, while simultaneously the clock 2906 of the head cartridge 2009 is forced to the left side in the figure, with the energizing force of a coil spring 2610 against the hook 2013 engaged therein, whereby the head cartridge 2009 is subject to the moment force around the above mentioned direct contact portion. Then a substrate 2906d on the head is brought into direct contact with the abutting portion 2601f, so that the head cartridge 2009 can be positioned in both left and right directions, thereby holding that position.

At this time, the projection portion 2605A of the rubber pad 2605 is compressed by coming into direct contact with the substrate 2906d. This deformation causes a force pressing a terminal pad of the flexible substrate 2604 into contact with a terminal of the substrate 2906d, in which as the substrate 2906d is in direct contact with the abutting portion 2601f, the amount of deformation for the projection portion 2605A is kept constant, thereby causing a stable pressing force as indicated above.

In the above figure, the compressed state of the projection portion 2605A is not shown.

The forward or backward and upper or lower positioning for the head cartridge 2009 can performed in the attaching process.

FIG. 7 is an exploded perspective view of the above mentioned carriage 2011.

Here, 2613 is a roller spring as described later, and 2615 is a lever stop for mounting an operation lever 2015 onto a mounting portion 2617 on the carriage 2011. 2619 is a mounting member constituting one end portion of a flexible cable 2021, for fixing upper edge portions of a flexible substrate 2604 and a rubber pad 2605 integrated therewith in this example to the support plate 2606, while 2621 is also a mounting member for fixing lower edge portions thereof.

In addition to the construction as above mentioned, a substrate cover 2623 is provided for covering the flexible substrate 2604 on the carriage side when the head cartridge 2009 is not attached, and protecting the flexible substrate 2604 and a circuit within the main body connected thereto, from a contact with hands of an operator and a breakage due to the contact or an action of an electrostatic force. This substrate cover 2623 is rotatably secured into pins 2621A on the lower edge portion mounting member 2621 for the substrate. 2625 is a spring for exerting a tendency to rotate the substrate cover 2623 toward the direction of covering the flexible substrate 2604, and 2627 is a recess for housing the substrate cover 2623 when the head cartridge 2009 is attached.

Figure 7B:
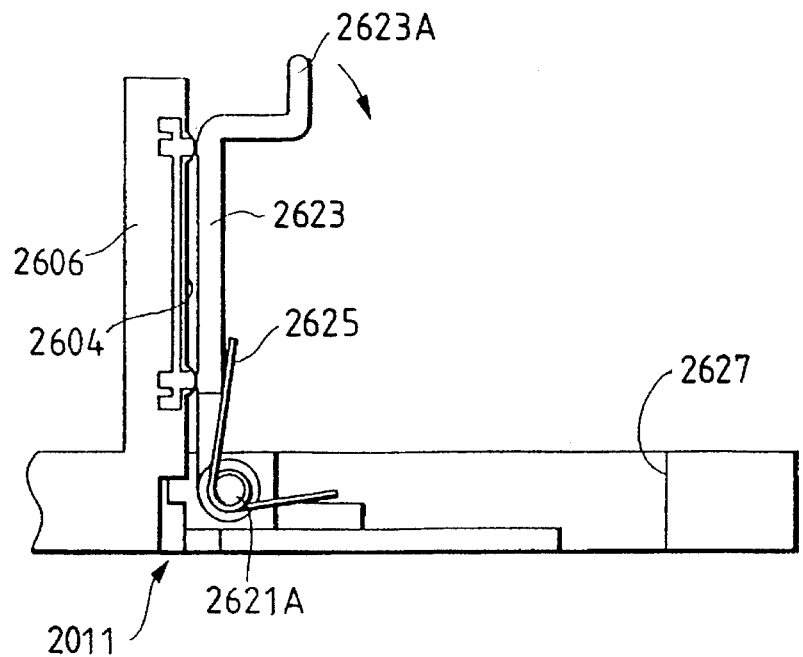
Figure 7C:
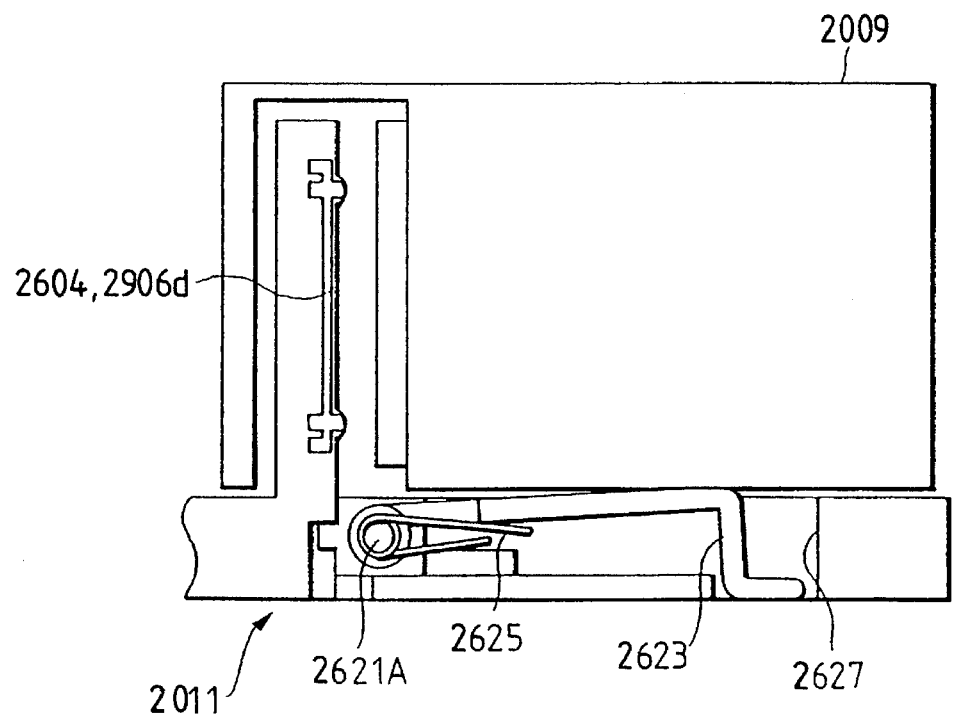

Referring now to FIGS. 7B and 7C, the operation of the substrate cover 2623 will be described. When the head cartridge 2009 is not attached, the substrate cover 2623 covers a flexible substrate 2604 with a biasing force of a spring 2625, as shown in FIG. 7B. If the head cartridge 2009 is attached from an upper side in the above state, the substrate cover 2623 is rotated clockwise in the figure around pins 2621A against the biasing force of the spring 2625, with the engagement between the lower surface of the head cartridge and a cover operation portion 2623A, or the engagement between an operator hand and the operation portion 2623A. And if the head cartridge 2009 is completely attached, and the substrate 2604 is placed in direct contact with the substrate 2906d on the head side, the cover 2623 is housed in the recess 2627 by being pressed against the lower surface of the head cartridge 2009, as shown in FIG. 7C. It should be noted that if the head cartridge 2009 is removed, the cover 2623 immediately returns to the state as shown in FIG. 7B, thereby protecting the substrate 2604.

Figure 8A:
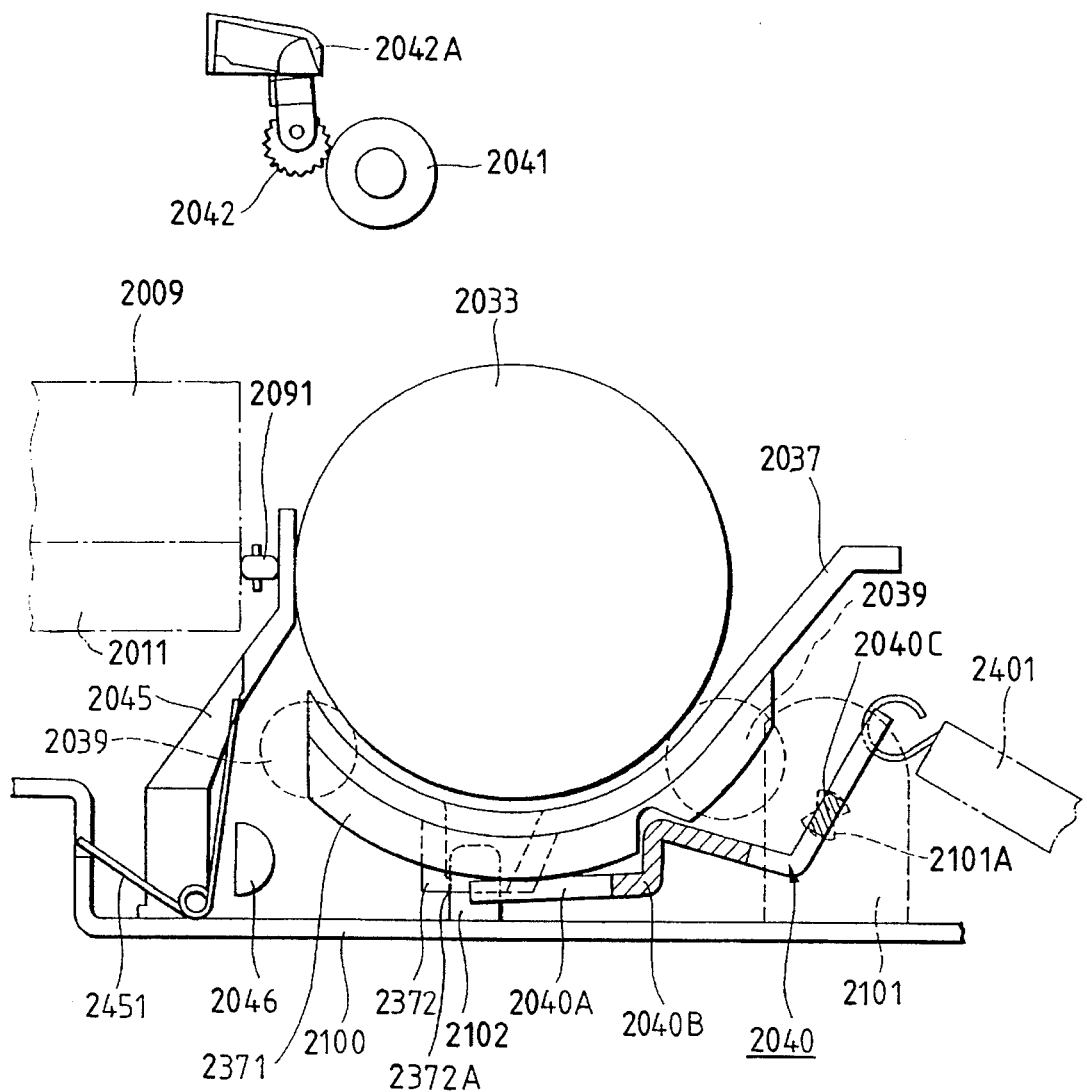

FIG. 8A is a typical side view for mainly showing a recording medium conveying system of the apparatus as shown in FIG. 2.

FIG. 8A shows an arrangement of each of elements at the normal conveyance of a recording medium. The recording medium fed from a feed paper tray not shown is introduced into a conveying path formed between a conveying roller 2033 and a paper pan 2037. In this conveying path, the recording medium is conveyed with the friction force between the conveying roller 2033 and the recording medium, based on the pressing force of the feed roller 2039, by the conveying roller 2033 rotating clockwise in the figure. Thereafter, the recording medium is introduced between the conveying roller 2033 and a paper presser bar 2045, and then also conveyed with the friction force between the conveying roller 2033 and the recording medium, based on the pressing force of the paper presser bar 2045. Further, the recording medium is regulated in the direction by the paper presser bar 2045, and conveyed along a platen 2034 between a paper exhausting roller 2041 and a spur 2042, while the recording is performed onto the recording medium with the discharge of ink droplet from a recording head cartridge 2009.

FIG. 8B is a top view showing a paper pan 2037, and a release plate for forcing it in the direction toward the conveying roller 2033, which are separated for clarity of explanation.

Referring now to FIGS. 8A and 8B, the mechanism for conveying a recording medium will be described. In these figures, 2040 is a release plate which is a member for pressing a feed roller 2039 to a conveying roller 2033 via a paper pan 2037, and releasing that pressing force. The release plate 2040 rotatably bears on an axis such that axis portions 2040c provided on the ends thereof are in engagement with axis holes 2101A on an axis bearing member 2101 for the release plate 2040 disposed on a bottom plate 2100 of the mechanism, so that if this portion is forced obliquely toward the right lower direction by a spring 2401 engaging at two end positions of the release plate 2040, the release plate 2040 rotates clockwise by bearing on the axis portion 2040c, as shown in FIG. 8A. 2371 donates ribs provided at two locations underneath the paper pan 2037. The ribs 2371 are brought into contact with the pressing portion 2040A during the above rotation of the release plate 2040, and pressed upwardly in FIG. 8A. Thereby the feeder roller 2039 which bears on the ribs 2371 presses the conveying roller 2033.

The release of pressing force with the release plate 2040 is performed in such a way that a shoulder 2040b extending at one end of the release plate 2040 is pressed downwardly in FIG. 8A against the rotation force owing to a spring 2401. If this pressing force is released, the paper pan 2037 and the feed roller 2039 move downwardly by their weights, thereby providing a predefined amount of space between the feed roller 2039 and the conveying roller 2033.

2372 is a rectangular projection portion formed when a portion of the paper pan 2037 extends downwardly. In the projection portion 2372 is provided a rectangular hole 2372A, which engages a projection 2102 upstanding on the bottom plate 2100 with a predetermined amount of looseness. With this engagement, the positioning of the paper pan 2037, and hence the feed roller 2039 with respect to the conveying roller 2033 can be performed.

Figure 9A:
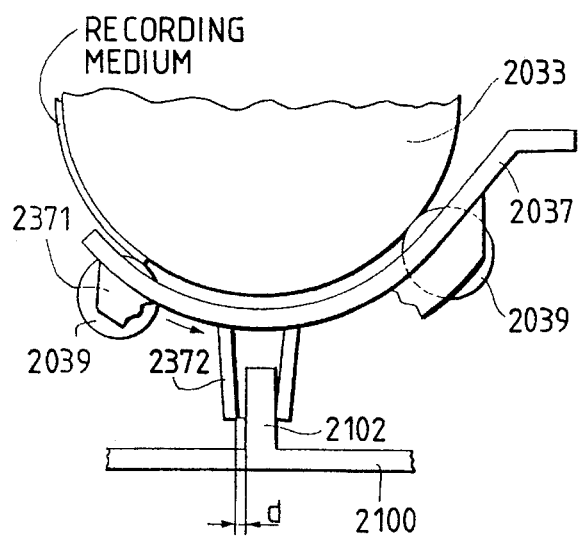
FIGS. 9A and 9B are typical side views showing a configuration for the run off of a feed roller in the above mentioned conveying system.
Figure 9B:
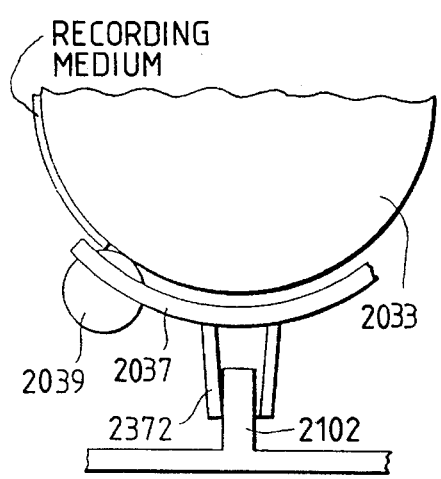

With the arrangement having a looseness in the above engagement, an adverse effect due to so called kicking, which occurs when a trailing portion of a recording medium to be conveyed passes through the feed roller 2039, can be eliminated. While the recording medium is transferred from the state where a trailing portion of the recording medium is pressed against the conveying roller 2033 by the feed roller 2039 as shown in FIG. 9A, to the state where the feed roller 2039 and the conveying roller 2033 are in direct contact with each other as shown in FIG. 9B, the recording medium is forced out between the feed roller 2039 and the conveying roller 2033. In a conventional construction, especially when the recording medium is an envelope or a cardboard, such kicking phenomenon occurs with the force exerting on various portions in forcing out the recording medium.

Figure 9C:
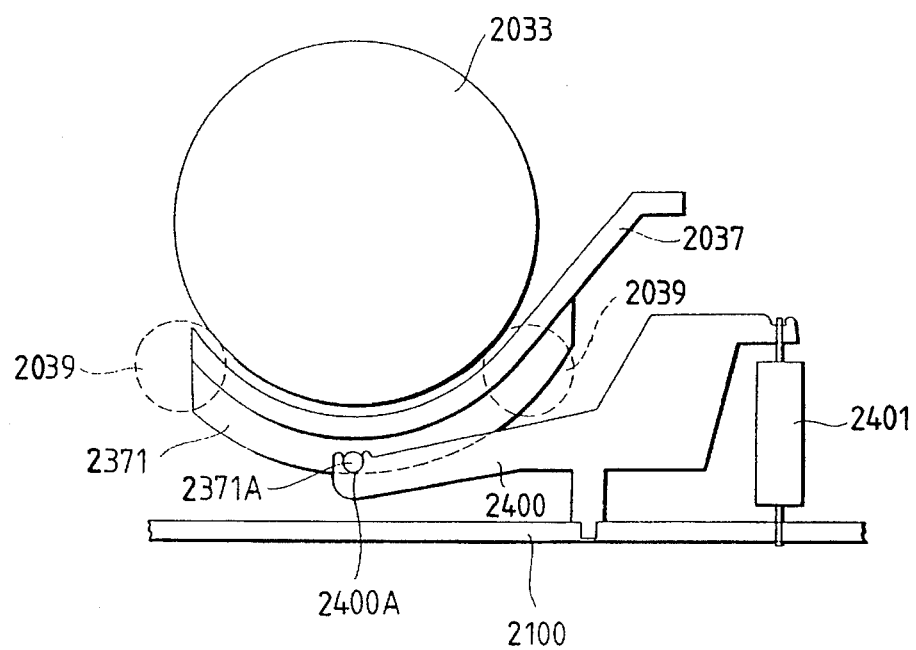
FIG. 9C is a typical side view showing one conventional example of an energizing mechanism for a feed roller.

For example, in a conventional construction for carrying the paper pan as shown in FIG. 9C, or in a construction where the boss 2371A of the paper pan 2037 is carried by the engagement portion 2400A of the energizing member 2400 to prevent movement in the forward and backward directions (left and right directions in the figure), the feed roller 2039 can not escape in a reverse direction to the direction of forcing the recording medium out, thereby causing the conveying roller 2033 to be rotated in forcing out the recording medium, so that the recording medium is conveyed by a greater distance than a predetermined amount. Consequently, there occurred such a problem that a recording position on the recording medium is deviated.

On the contrary, in the construction in accordance with this example as shown in FIG. 8A and FIGS. 9A and 9B, the paper pan can escape by a distance d with the above engagement in the right direction in the figures, in forcing out a trailing portion of the recording medium, in which the force due to the extrusion will not be exerted on the recording medium and the conveying roller 33, thereby such a problem as mentioned above does not occur.

Referring now to FIG. 8A again, 2451 is a spring for biasing the paper presser bar 2045 in the direction toward the platen 2033.

The spring 2451 has one end thereof extending from the coil-shaped portion engaged with a portion of the paper presser bar 2045, and the other end engaged with a portion of the bottom plate 2100 of the mechanism. The coil-shaped portion bears on a portion of the bottom plate 2100. The paper presser bar 2045 is pressed via a roller 2091 provided on a leading portion of the carriage 2011 against the carriage 2011, as described later. The distance between the discharge ports of the head cartridge 2009 and a record face of the recording medium can be properly maintained by the biasing force via the roller 2091 by the spring 2045.

The paper presser bar 2045 also exerts the pressing force on the conveying roller 33 via the recording medium due to the biasing force as above described, thereby conveying the recording medium with a friction force between the recording medium and the conveying roller 33 based on that pressing force.

Here, to convey successfully various types of recording media, it is requisite to make appropriate the friction force between the paper presser bar and the recording medium, and between the conveying roller and the recording medium. In other words, it is desirable that the friction force between the paper presser bar and the recording medium is as small as possible, while that between the conveying roller and the recording medium is as large as possible.

Further, it is also desired to make the friction force between the paper presser bar and the conveying roller as small as possible. This is because if that friction force is large, the motor load becomes large at so-called idle feeding. If a predetermined amount of gap is provided between the paper presser bar and the conveying roller to avoid it, the precision control becomes difficult with respect to the pressing of the recording medium against the platen.

Hence, in this example, the material of the paper presser bar 2045 is POM (polyacetal), and that of the conveying roller 2033 is CR (chloroprene rubber, hardness 60° in JIS K6301A scale) mixed with 5–10% (weight ratio) of monofilament of nylon resin. Fluororesin can be also used for the paper presser bar 2045.

It should be noted that the hardness of above mentioned chloroprene rubber was 60°, but if it is within the range from 50° to 70°, it does not have an adverse effect on the conveyance of the recording paper. It is not necessary that the conveying roller 2033 and the paper presser bar 2045 are entirely made of the material as above indicated, but only direct contact portions may be constructed of that material, or further the paper presser bar and the conveying roller can be formed by pasting a sheet member of the above material onto the body portion.

As the friction coefficient between the paper presser bar 2045 and the recording medium can be reduced by fabricating the paper presser bar and the conveying roller with any of above materials, the paper presser bar 2045 can be configured to press against the conveying roller 2033, as described above. Consequently, the distance between the recording medium and the head cartridge can be controlled more easily than that in a previous construction which did not allow for various paper thicknesses of recording medium. As the friction coefficient between the recording medium and the conveying roller is larger, the sliding does not occur during the conveyance, whereby the successful conveyance of the recording medium can be accomplished.

In FIG. 8A, 2046 is a shaft member which extends parallel to the paper presser bar 2045, in which both ends thereof bear on the device frame, with its cross-section being a D character shape. When a recording medium is conveyed, the rotation position is determined so that a straight portion of the D character shape is placed in a longitudinal direction (from the upper to the lower direction in the same figure). On the other hand, when the pressing force of the paper presser bar 2045 against the conveying roller 2033 is released as shown in FIGS. 31 and 32, the straight portion of the paper presser bar is directed transversely (from the left to the right direction in FIG. 8A) so as to come into direct contact with a portion of the spring 2451, causing the spring to be biased, thereby releasing the engagement between the spring 2451 and the paper presser bar 2045. Thus, the pressing force is only released without changing the position of the paper presser bar 2045.

Consequently, even if the carriage is operated with the pressing force being released for the insertion of a recording medium, the head cartridge and the carriage are not damaged with the interference between the head cartridge and carriage and the paper presser bar. In other words, it is possible to perform various operations by moving the carriage, even while the pressing force of the paper presser bar is being released. The pressing force against the paper presser bar 2045 via the roller 2091 is not released in this case, but this pressing force is directed to one point of a portion where the paper presser bar 2045 is opposed to the carriage 2011, and so it does not have any problem for inserting the recording medium.

In FIG. 8A, 2041 is a paper exhausting roller, with which a spur 2042 engages. The spur 2042 is energized against the paper exhausting roller 2041 by the energizing means as shown in FIGS. 10 and 11, in which the recording medium can be also conveyed with the friction force between the recording medium and the paper exhausting roller 2041 based on that pressing force, as previously described. The spur 2042 is energized via a holding member 2042A against the paper exhausting roller 2041 as described above, and can be released from the engagement therewith, by the detaching operation from the paper exhausting roller 2041 via the holding member 2042A.

Figure 8C:
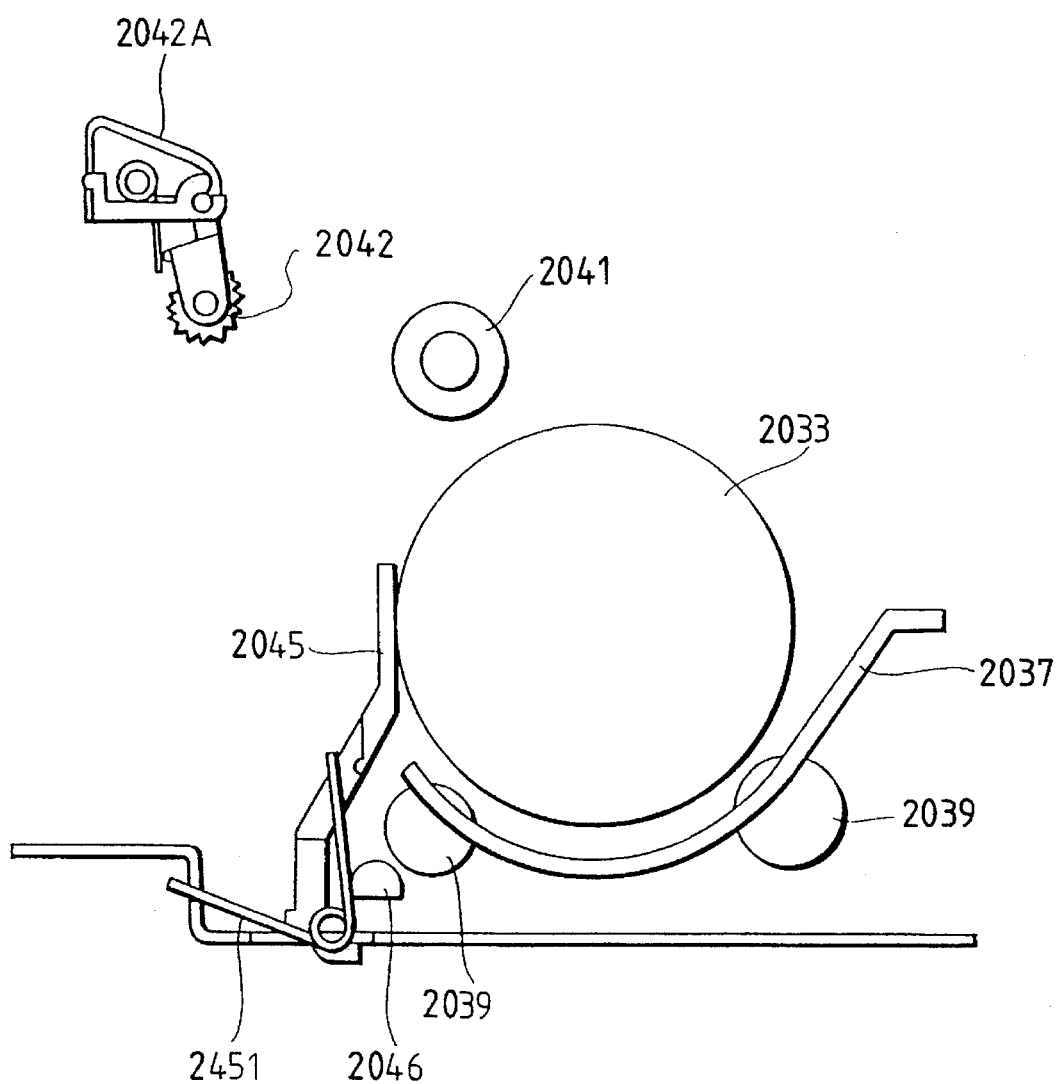
FIG. 8C is a cross-sectional side view showing a state where each energizing force is released on the above mentioned conveying system.

As described above, the paper pan 2037 (feed roller 2039), the paper presser bar 2045 and the spur 2042 as shown in FIGS. 8A and 8B can be released from their energizing forces in the respective forms. Those releases can be performed simultaneously by the operation of a release lever 2043 as shown in FIG. 2, resulting in the state as shown in FIG. 8C.

Figure 10A:
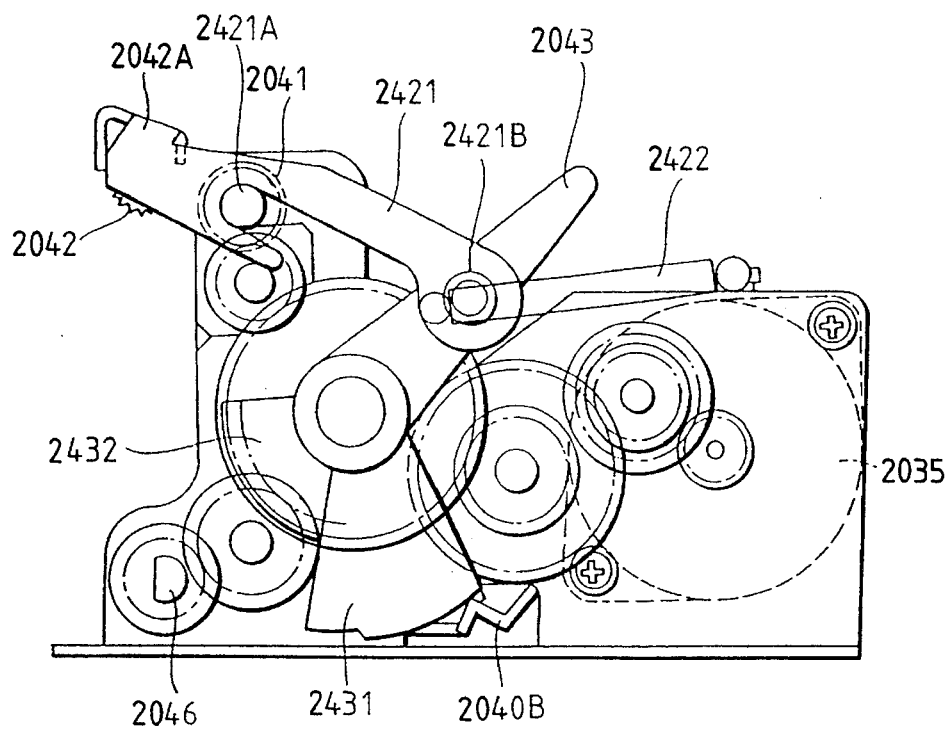
FIGS. 10A and 10B are side views of portions disposed on the right hand of a device in a mechanism for releasing an energized state of a feed roller, a paper presser bar and a spur on the above mentioned conveying system, before and after the releasing thereof, respectively.
Figure 10B:
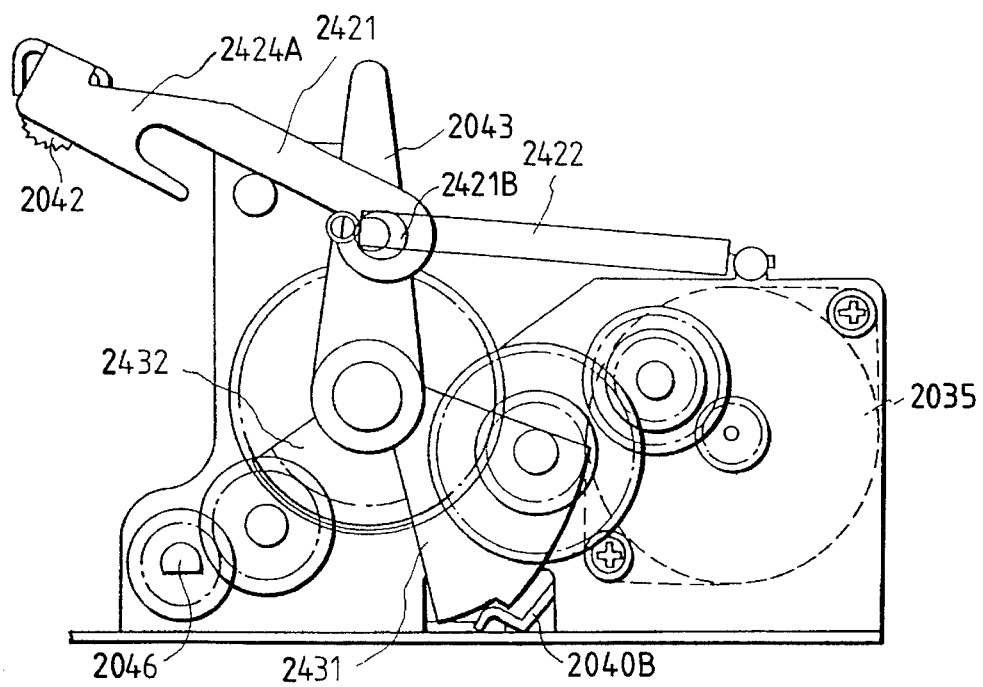
Figure 11A:
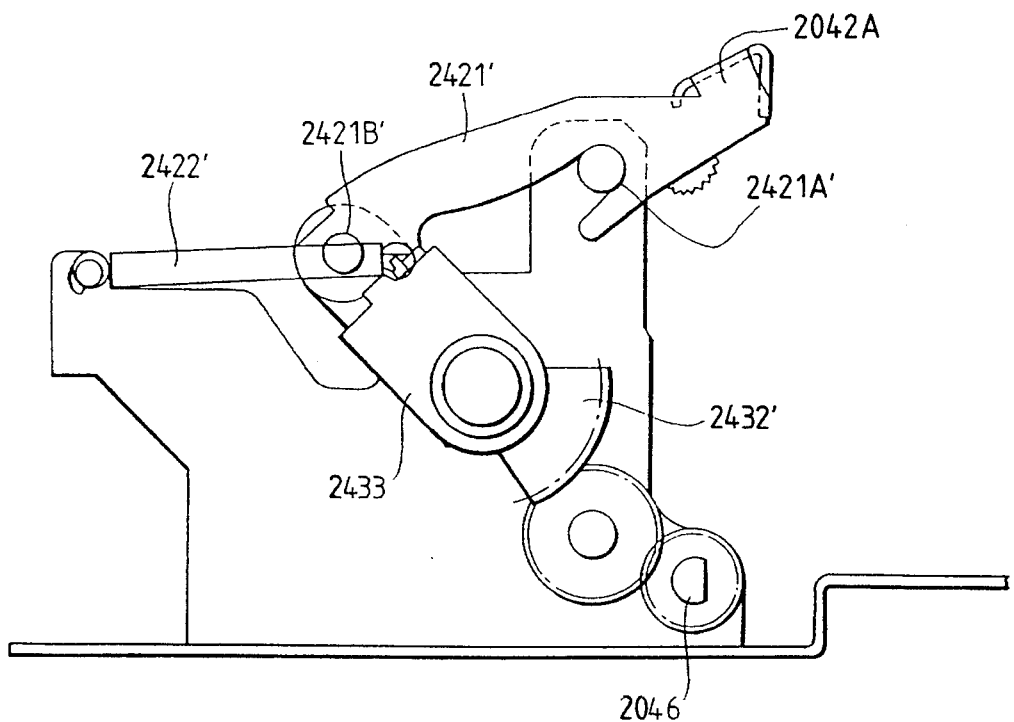
FIGS. 11A and 11B are side views of portions disposed on the left side of the device in the same mechanism, before and after the releasing thereof, respectively.
Figure 11B:
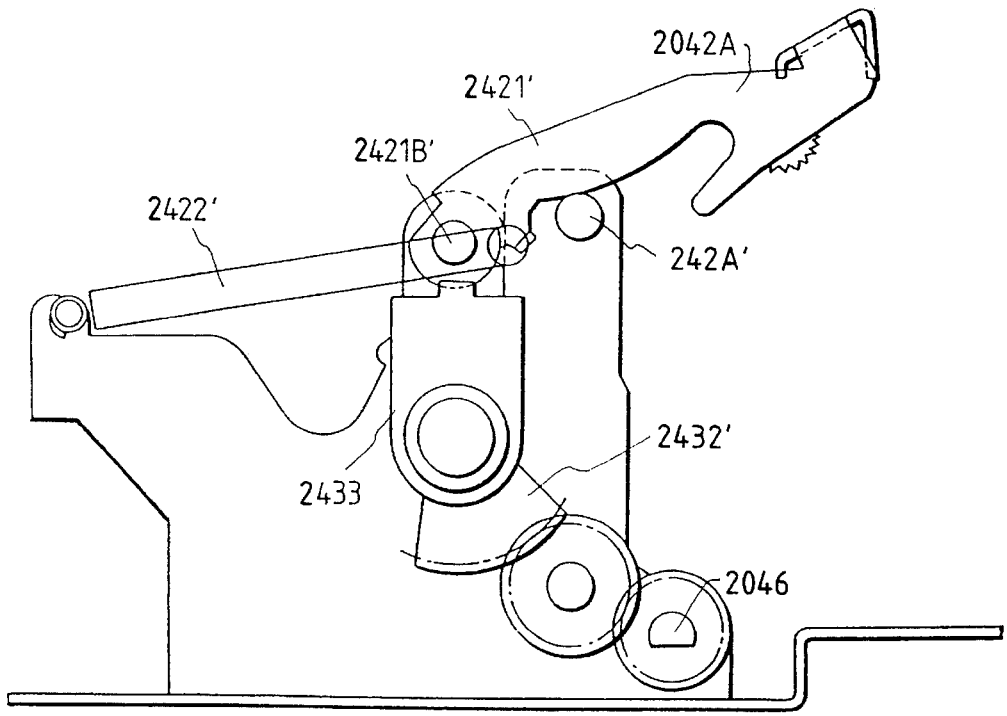

FIGS. 10A and 10B, and FIGS. 11A and 11B are views showing the mechanism for releasing the above mentioned energizing forces, in which FIGS. 10A and 10B show that mechanism of the recording apparatus viewed from the right side, while FIGS. 11A and 11B show the same mechanism viewed from the left.

FIG. 10A and 11A show a state where the energizing force in conveying a recording medium is not released. Then the release lever 2043 which rotatably bears on a shaft of the conveying roller 2033 is placed in a laid position due to the energizing force of a spring as described later, whereby a cam member 2431 fixed to the lever 2043, a gear 2432, and a gear 2432' disposed on the other end portion opposite to the end portion at which the lever 2043 is disposed, and fixed to the shaft coaxial with that of the conveying roller 2033 are in engagement with a shoulder portion 2040B of the release plate 2040 and a train of gears for rotating a shaft member 2046, with predetermined positional relations. Spur arms 2421 and 2421' extending from the spur holding member 2042 and disposed on both end portions thereof are forced backwardly of the device via the respective engagement portions 2421B and 2421B' in engagement with the lever 2043 and the connection member 2433, by the tensile forces of the springs 2422 and 2422'. In this energizing condition, the engagement portions 2421A and 2421A' provided on the respective spur arms can engage with the shaft of the paper exhausting roller 2041, so that the appropriate engagement between the spur 2042 and the paper exhausting roller 2041 with a proper position and a pressing force can be accomplished.

As the engagement of the spur arms 2421 with the release lever 2043 is accomplished with a predetermined amount of looseness, the appropriate engagement of the spur 2042 with the paper exhausting roller 2041 can be performed without requiring a great precision for the shape of the spur arms 2421 and so on.

The rotation of the release lever 2043 is transmitted via a gear 2432 and a train of intermediate gears to the shaft member 2046, and therefrom to a train of intermediate gears and a gear 2432' on the opposite end portion, and the connection member 2433, finally moving the spur arm 2421'. In this case, the looseness due to the backlash between the gears interposed therein can be absorbed by the engagement with a looseness between the release lever 2043 and the spur arm 2421 as shown above.

It should be noted that a member that can be released from the energized condition with the above configuration is not limited to the spur, but may be any type of roller for conveying a recording medium.

FIGS. 10B and 11B show the state where the spur 2042, the paper presser bar 2045 and the paper pan 2037 have been released from the respective energized conditions. These releases can be accomplished by rotating the release lever 2043 forwardly of the device against the tensile force with the spring 2422.

That is, if the release lever 2043 is rotated, the gear 2432 is rotated accordingly. Then, as described above, the shaft member 2046 is rotated via the train of intermediate gears in engagement with the gear 2432, thereby making a straight line portion of the D character shape cross-wise, so that the shaft member 2046 forces the spring 2451 toward the direction for narrowing the spring 2451, as described above in FIG. 8A, thus releasing the engagement between the spring 2451 and the paper presser bar 2045, and so releasing the energizing force for the paper presser bar 2045.

Along with the rotation of the release lever 2043, a cam 2431 can be rotated. With a cam portion of the cam member 2431 is engaged the shoulder portion 2040B of the release plate 2040, as described above in FIG. 10, and when the cam member 2431 rotates, the release plate 2040 lowers its position and thus releases the engagement with the ribs 2371 of the paper pan 2037, thereby not pressing the ribs 2371. Consequently, the force for energizing the paper pan 2037 (feed roller 2039) toward the conveying roller 2033 is released, and the paper pan 2037 falls downward by its weight. With the rotation of the release lever 2043, the shoulder portion 2040B and a step-like cam portion of the cam member 2431 are finally engaged, so that the engagement position thereof is fixed, and therefore the rotational position of the release lever 2043 is fixed.

Furthermore, with the rotation of the release lever 2043, the spur arm 2421 moves forwardly of the device, and with the transmission of the rotation via the shaft member 2046, as described above, the spur arm 2421' on the opposite end portion moves forwardly of the device, whereby the spur 2042 connected to the spur arms 2421, 2421' is released from the engagement with the paper exhausting roller 2041.

In this way, by rotating the release lever once, the energizing force for the paper pan, the paper presser bar and the spur can be released, which is accomplished with a simple construction.

It should be noted that a support for the paper pan is constructed with the energizing against the release plate, and the engagement between a projection provided on the bottom plate of device and a long hole of the paper pan in the above example, but it is also constructed such that the shape of the engagement portion 2400 is a long hole toward which the paper pan can run off, as shown in FIG. 9C.

Figure 15:
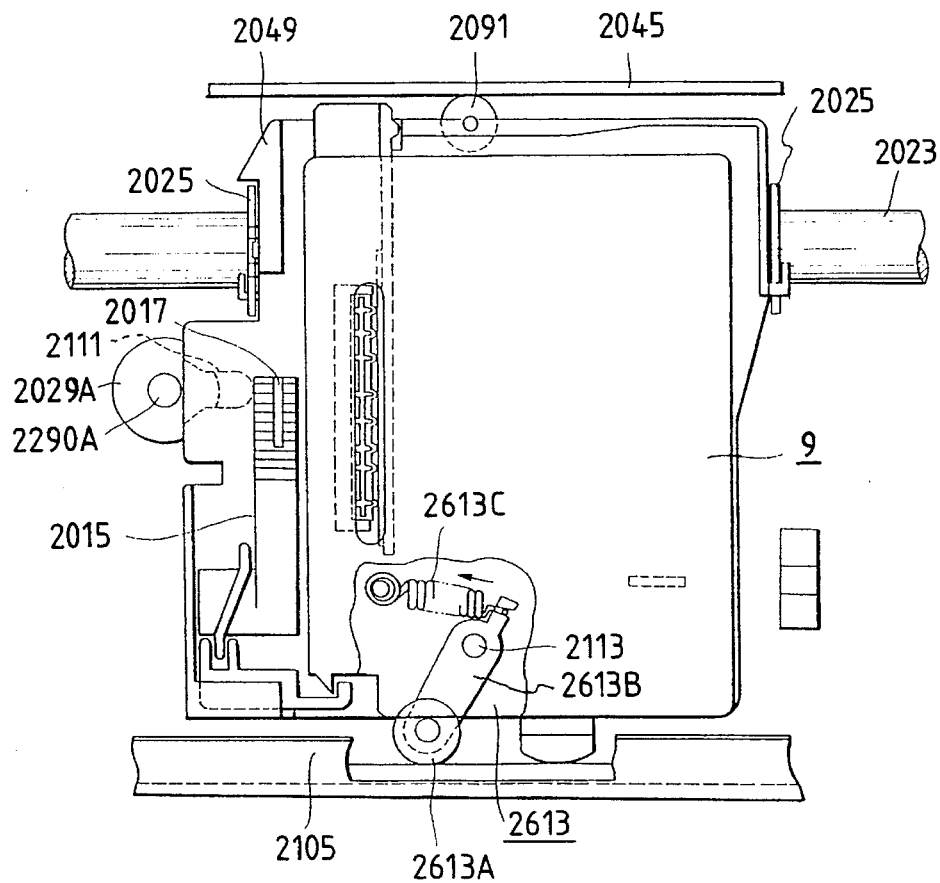

FIG. 12 is a typical front view showing a knob fixed to the shaft of the conveying roller 2033 and an assembled state of the release lever as above mentioned, and FIG. 15 is a typical exploded view.

In FIG. 12, a driven gear 2321 for rotating the conveying roller 2033 is fixed to a shaft 2333 of the conveying roller 2033, while a knob 2005 is fixed to the shaft 2333 by a spring pin 2332 drifted into the shaft 2333. The release lever 2043 freely rotatably bears on the shaft between them, but has a range of rotation restricted by a spring as above described.

FIG. 13 is a view for explaining a sequence of assembling the above construction. As shown in the same figure, the spring pin 2332 has been drifted into the shaft 2333 beforehand, to which a gear 2331 is fixed. The release lever 2043 is inserted into the shaft 2333 in this state through an opening section 2043A. The opening section 2043A has a shape through which the shaft 2333 and the spring pin 2332 can pass as shown in the same figure, whereby the release lever 2043 can move beyond a position where the spring pin 2332 was drifted, to the side of gear 2331. Thereafter, a knob 2044 is fixed by fitting the spring pin 2332 into a slit 2005A while inserting the knob 2005 into the shaft 2333.

With the above construction, the axial movement of the release lever 2043 can be restricted by means of the gear 2331 and the knob 2005, and the knob 2044 can be fixed by means of the spring pin 2332. As the spring pin 2332 is drifted beforehand into the shaft 2333, the assembling is simpler than a case where the spring pin is drifted after inserting the lever.

Figure 14:
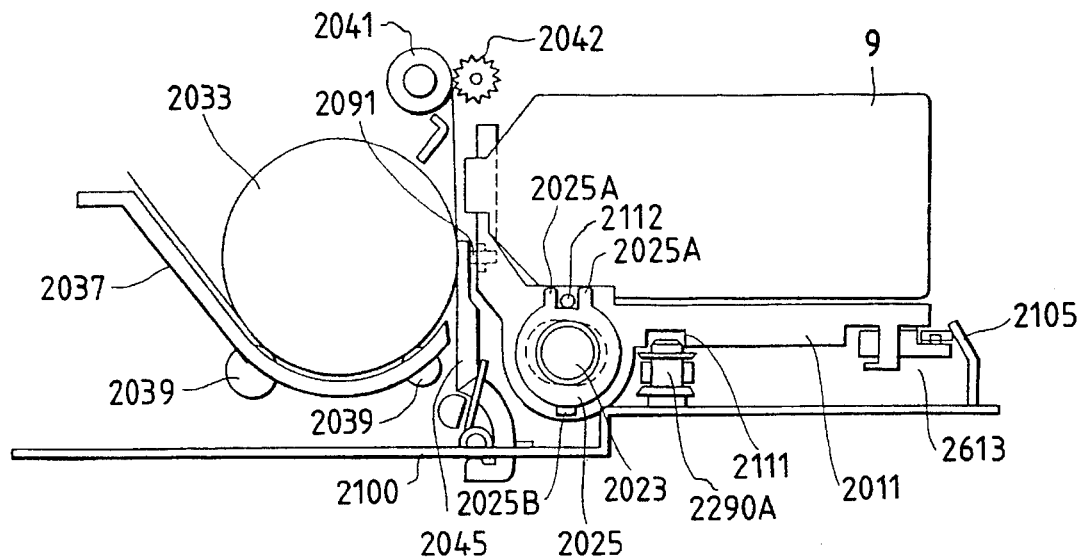
FIG. 14 and FIG. 15 are side and upper views for explanation of an engagement relation of the carriage as shown in FIG. 2 with other elements, respectively.

FIGS. 14 and 15 are side and upper views showing the mechanism around a head cartridge 9 as shown in FIG. 2.

In these FIGS. 2091 is a roller which freely rotatably bears on a shaft at a front end portion of the carriage 2011, as previously described. The roller 2091 is provided so that a portion thereof may project forwardly of a discharge port face of the head cartridge, in which it comes into direct contact with the paper presser bar 2045 and rotates thereon. 2613 is a roller spring provided on a trailing portion of the carriage 2011. The roller spring 2613 is comprised of a roller 2613A, a connection member 2613B on which the roller 2613A bears, and a spring 2613C for energizing the connection member 2613B toward a predetermined rotational direction. The roller 2613A is brought into direct contact with a front end plate 2105 extending parallel to a guide shaft as previously described at a front end portion of the bottom plate 2100 of device, on which it rolls. The connection member 2613B freely rotatably bears on a predetermined shaft 2113 of the carriage 2011, while the spring 2613C is carried on a predetermined axis to force the connection member 2613B to rotate counterclockwise around the shaft 2113. With the above construction of the roller spring 2613, the carriage 2011 is always energized toward the paper presser bar 2045.

2025 denotes bearings for engaging with a guide shaft 2023, mounted on both side end portions of the carriage 2011. The bearings 2025 have the bearing portion eccentric to the case to be mounted, in which two bearings 2025 are mounted with the eccentric direction being opposite to each other. The bearing 2025 on the side as shown in FIG. 14 is able to swing around a boss 2112 on the carriage 2011. That is, a portion of the carriage 2011 to which this bearing 2025 is mounted is formed with a long hole, with two projections 2025A of the bearing 2025 regulating the movement in the forward or backward direction (the left or right direction in FIG. 14) in conjunction with the boss 2112. Consequently, this bearing 2025 swings relative to the carriage 2011, in correspondence with the movement of the carriage 2011, as will be described later. The movement of this bearing 2025 in the direction toward the guide shaft 2023 is regulated to a part of the carriage 2011 (refer to FIG. 7A) by a projection 2025B provided on the bearing 2025.

Figure 16A:
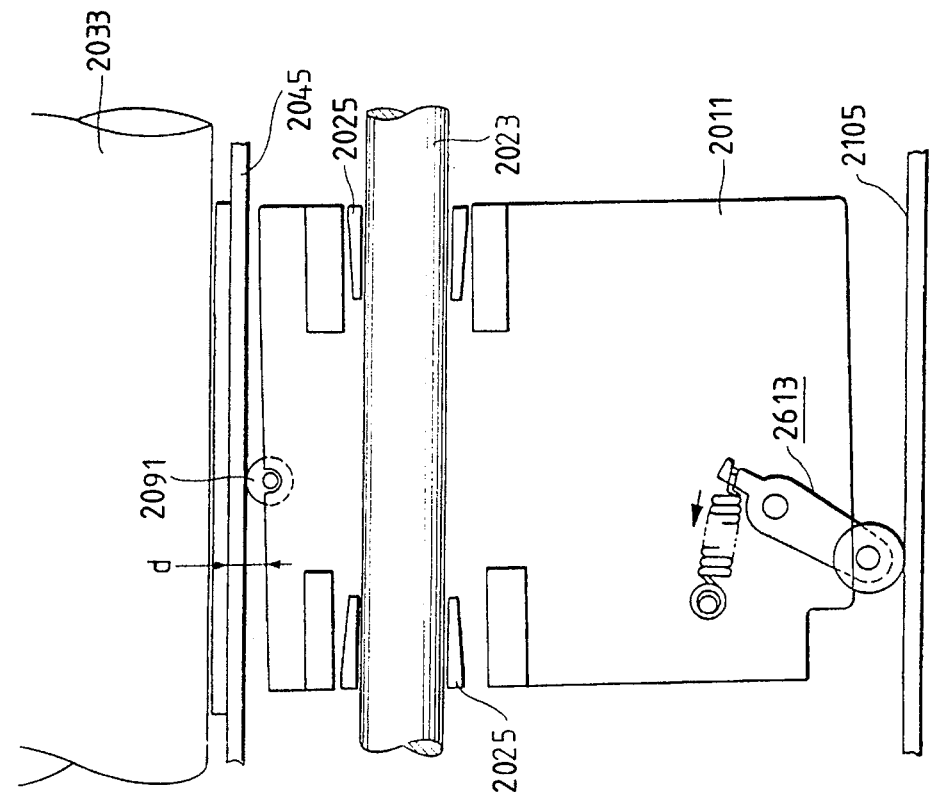
FIGS. 16A and 16B are typical upper views showing how the above mentioned carriage changes its position depending on the thickness of a recording medium.

Referring now to FIGS. 16A through 17, the automatic adjustment of an interval (thereafter referred to as a gap) between a recording medium and a discharge port face of the head cartridge, based on the construction of the roller 2091, the roller spring 2613 and bearings 2025 will be described in the following.

Figure 16B:
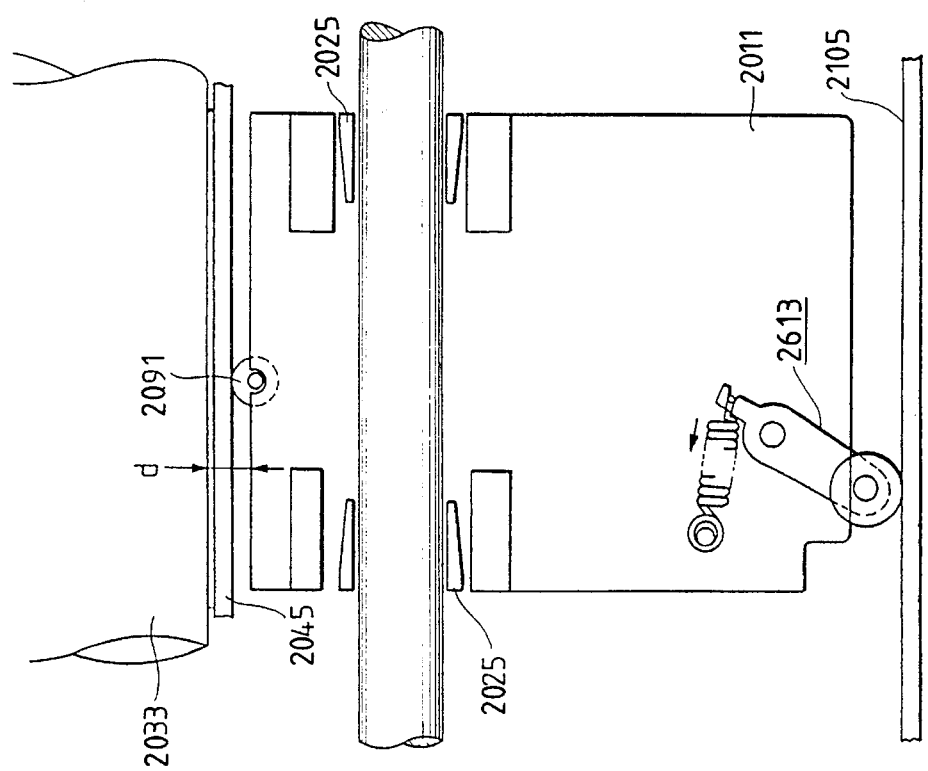

The automatic adjustment of the gap can be performed depending on the thickness of a recording medium inserted between the paper presser bar 2045 and the platen roller 2033. When the recording is performed onto a relatively thin, ordinarily used recording medium as shown in FIG. 16A, the left bearing 2025 in FIGS. 16A and 16B are located almost centrally in the long hole. The carriage 2011 is energized toward the paper presser bar 2045 by a reaction force from the front end plate 2105 biased by the roll spring 2613, whereby the roller 2091 presses the paper presser bar 2045. Respective reaction forces against the force with which the roller 2091 presses the paper presser bar 2045, and the force with which the above mentioned roller spring 2613 biases the front end plate 2105 may cause the moments around the right bearing in FIGS. 16A and 16B, respectively, and the position of the bearing 14 in the long hole as indicated above can be determined when two moments are in equilibrium. In other words, the guide shaft 2023 fixed to the body of device, and hence the position of the carriage 2011 relative to the bearings 2025 are determined, so that a gap d between discharge ports of the head cartridge 2009 mounted thereon and a recording medium can be determined.

FIG. 16B shows a position of the carriage 2011 when the recording is performed onto a relatively thick recording medium, e.g. an envelope. In this case, the roller 2091, and hence the carriage 2011, retract downwardly in the same figure due to the thickness of a recording medium, as compared with those in FIG. 16A. Thereby a reaction force from the front end plate 2105 caused by the roll spring 2613 changes, so that an equilibrium position of the above moments correspondingly changes. Consequently, a relative position between the bearing 2025 on the left side in the figure and the carriage 2011 changes, whereby the carriage 2011 has its front end portion open to the left side in FIGS. 16A and 16B, and the gap between the discharge ports and the recording medium is almost equal to a gap d as shown in FIG. 16A. In this case, the bearing 2025 on the left side changes the position in the long hole by swinging relatively as indicated by an arrow in FIG. 17.

It should be noted that a recording medium thicker than an ordinary cardboard, for example, can be used with the positional change of the roller 2091, or the paper presser plate 2045 can be left away greatly corresponding to such cardboard and keep the gap fixed, with the position of the roller 2091.

In the above construction, as shown particularly in FIG. 17, the roller spring 2613 presses the roller 2613A downwardly, when the roller 2613A comes in direct contact with a bowed oblique portion of the front end plate 2105, so that the whole carriage 2011 is pressed downwardly. Consequently, the carriage 2011 is prevented from lifting up, so that the direction of ink discharge from the head cartridge 2009 mounted thereon can be made stable.

Referring to FIG. 15 again, 2111 is a cut away portion on the left side lower portion of the carriage 2011, to be engaged with a pulley axis 2290A near a home position. This engagement is accomplished when the carriage 2011 moves to a cap position on the discharge port face, and in this engagement position, the discharge port face is covered with the cap 2051 (see FIG. 2).

With this engagement, even if the oscillation is applied to the recording apparatus, the cap 2051 is not detached from the discharge port face of the head cartridge 2009 because the carriage 2011 can not move in the forward or backward direction, whereby the capping is performed reliably.

As the pulley axis 2290A is also used to engage with the cut away portion 2111 of the carriage 2011, no particular member is necessary for this engagement, resulting in a simple and cheap construction.

Further, the cut away portion 2111 is formed with a beveled inlet portion so as to facilitate the engagement with the pulley axis 2290. Therefore the engagement can be easily accomplished, even when the carriage 2011 is displaced depending on the thickness of a paper.

Figure 18:
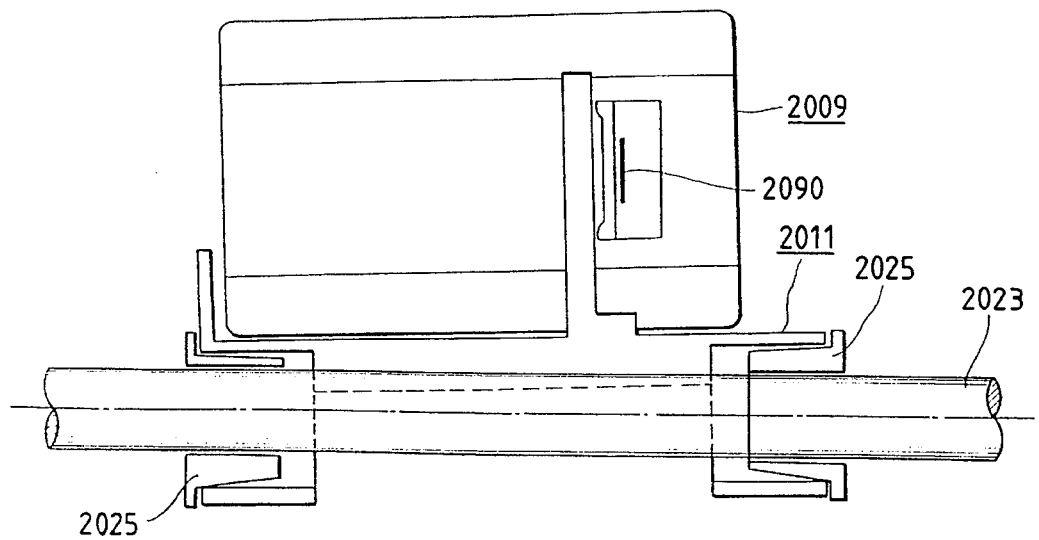
FIG. 18 is a typical front view showing a mechanism for inclining an array of discharge ports to the moving direction of the carriage as shown in FIG. 2.

FIG. 18 is a typical elevation view of the head cartridge 2009 and the carriage 2011 viewed from a recording medium side.

As clearly shown, the carriage 2011 and the head cartridge 2009 mounted thereon are inclined to the guide shaft 2023, and hence to the moving direction of the carriage 2011, so that the direction of an array of the discharge ports is also inclined.

This inclination is made by using two bearings 2025 whose bearing portions are eccentric as above described. That is, the left bearing 2025 (right bearing in FIG. 18) is mounted with its eccentric position located downwardly, as seen in FIG. 14 and FIG. 17, while the right bearing 2025 (left bearing in FIG. 18) is mounted with its eccentric position located upwardly.

Figure 19A:
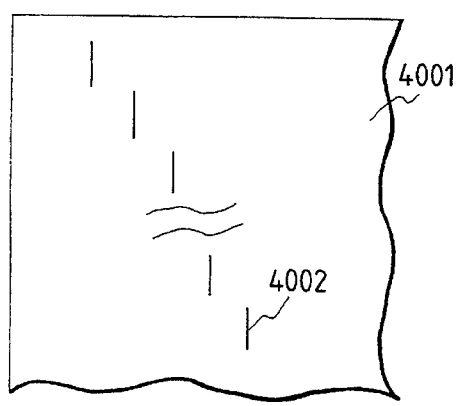
FIGS. 19A and 19B are typical plan views showing recording examples when the above mentioned inclining mechanism exists and does not exist, respectively.
Figure 19B:
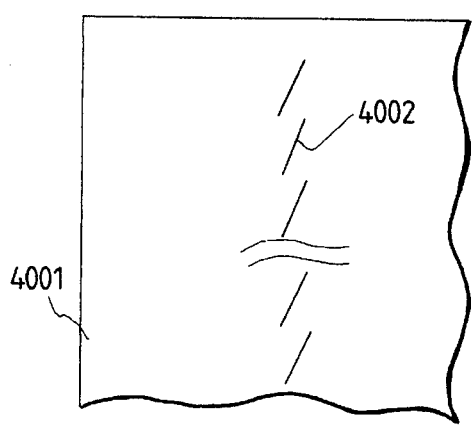

The configuration in which the array of discharge ports is inclined as shown above is used when a plurality of discharge ports are driven with the time division. An ink jet recording head is generally driven with the time division from a view-point that the recording speed and the drive power can not be increased. For example, in a case where the vertically arranged 64 discharge ports are divided into 8 blocks to drive with the time division, if the array of discharge ports is not inclined, the recording is performed on a recording paper, as shown in FIG. 19A, taking into consideration the carriage movement, which represents slanting lines as macroscopically seen. On the contrary, if the array of discharge ports is inclined as in this example, the recording is performed as shown in FIG. 19B, which represents vertical lines as macroscopically seen. It should be noted that this inclination is not only effective to the time division drive for each block, but also to the time division drive for each discharge port. Here, in FIGS. 19A and 19B, 4001 is a recording medium, and 4002 is a line recorded on the recording medium.

Since the inclination according to this example is accomplished by the bearings 2025 mounted on both side end portions of the carriage 2011, the precision of the inclination is easy to raise, because the distance between these bearings is relatively long. And as one type of bearing is necessary to mount in opposite vertical directions, the inclination is simply constructed. Furthermore, when the timings for the time division driving are different depending on the speed of the carriage, the inclination according to the above mentioned timing can be constructed by changing only the bearings without changes of the carriage and the recording head, so that it is possible to make a common use of the carriage.

Figure 20A:
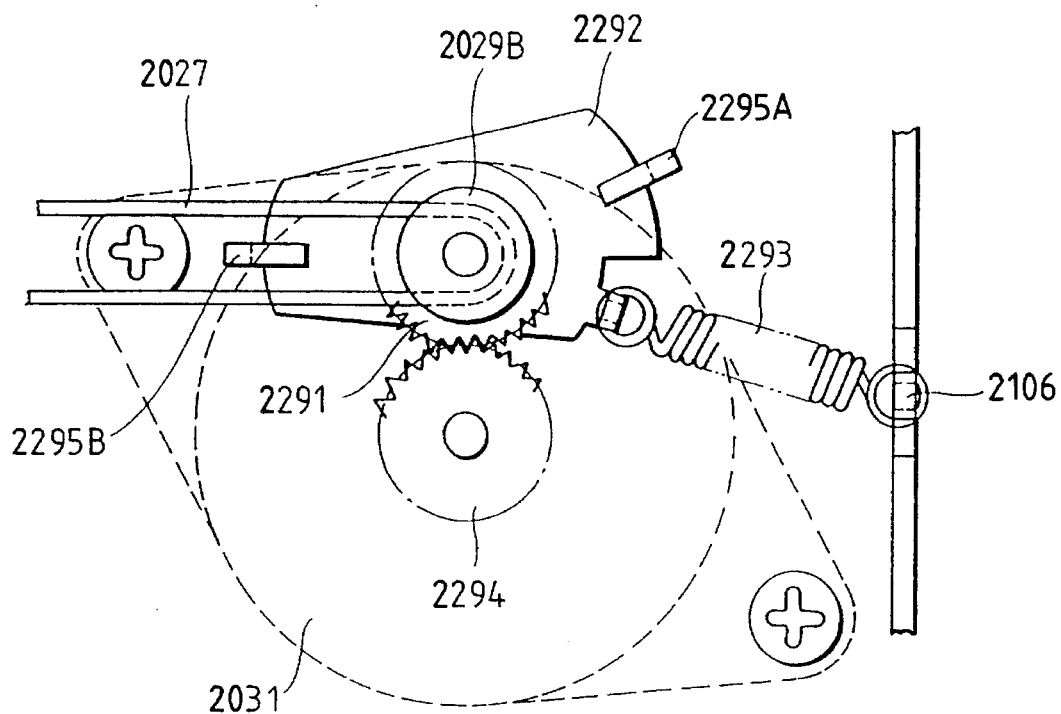
FIGS. 20A and 20B are upper and front views showing a tension mechanism for a belt and a drive mechanism for driving the carriage as shown in FIG. 2, respectively.
Figure 20B:
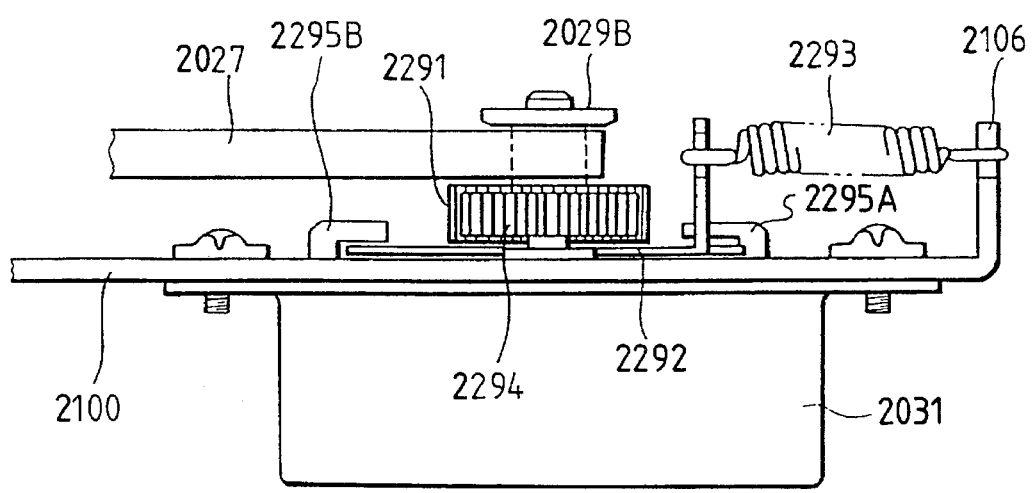

FIGS. 20A and 20B are upper and elevation views showing the detail near a pulley 2029B disposed on the right end portion of the device, wherein two pulleys are used to drive a timing belt for moving the carriage.

On the pulley 2029B is fixed coaxially a driven gear 2291, which mates with a drive gear 2294 fixed to the rotation axis of the carriage motor 2031. A bracket 2292 freely rotatably bears on a shaft to which the pulley 2029B and the gear 2291 are fixed.

One end of a spring 2293 is connected to the bracket 2292, while the other end thereof is connected to a projection 2106 disposed on the bottom plate 2100. Thereby the bracket 2292 is energized in the direction deviated by a predetermined angle from the direction along which the timing belt 2027 extends. Then the bracket 2292 (and the gear 2291 and the pulley 2029B which bear on the shaft thereof) moves freely, except that it is restricted in the upper or lower direction by the L-shaped members 2295A and 2295B provided on the bottom plate 2100 and in a predetermined direction along the bottom plate 2100. Accordingly, with the above mentioned energizing force by the spring 2293, the tension on the timing belt 2027 and the mating force between the gear 2291 and the gear 2274 can be obtained depending on each component of the spring force.

FIGS. 21 and 22 are a timing chart and a flowchart, respectively, for showing the control procedure in the recording position instructed mode for an ink jet recording apparatus according to this example.

The recording position instructed mode in accordance with this example is a control procedure that is activated when the recording is performed onto a formatted paper or a recording paper already once recorded, such as in an electronic typewriter which can use the recording position in accordance with this example. That is, the recording position and range are set and confirmed while moving the carriage (recording head), and during that period no ink droplet is discharged. Hence, in order to prevent the ink from being thick or undischarged, the predischarge and the capping are needed, in which the carriage is moved to a position for the predischarge for every predetermined time, by interrupting the processing such as the setting of recording position with the carriage.

Referring now to a timing chart of FIG. 21 and based on a flowchart of FIG. 22, the control procedure in the recording position instructed mode will be described.

If a command for instructing recording position is issued with a predetermined key input, this control procedure is activated, the cap 2051 is opened at step S201 (FIG. 21, only the timing is noted thereafter), and at step S202, the carriage 2011 is moved toward an instructed position, for example, by the input of space keys (timing 2). Meanwhile, at step S203, a determination is made whether a position is set with a predetermined key input for the instructed position, when the carriage 2011 has reached the instructed position, and if not, at S204, another determination is made whether a predetermined time T seconds have passed since the opening of the cap.

If T seconds have passed, a current position of the carriage 2011 is stored at S205, and the carriage 2011 is moved to a predischarge position at S206 (timing Further, a predetermined amount of ink is predischarged (A times) at S207 (timing 4). Then at step S208, the carriage 2011 is returned to the previously stored position, and at step S209, it is moved to the instructed position in the same way as above described. Meanwhile, at step S210, a determination is made whether a position is set with a predetermined key input for the instructed position in the same way as above described, and if not, another determination is made at step S211 whether a predetermined time α seconds have passed since the command for instructing position was issued, or this control procedure started. This α seconds was set because the setting of the instructed position would be normally terminated during this time, and because if the recording head is kept open without the cap beyond that period, it will cause a significant damage to the discharge of ink droplet.

If a negative determination is made at step S211, another determination is made at step S212 whether a predetermined time t seconds have passed since the previous predischarge, and if so, the processing proceeds to steps S213 and S214 which are the same as those above described, then the recording head predischarges B times at step S215, and flow returns to step S208.

If a position is set with a predetermined key input for the instructed position at step S203 or S210, the position is stored at step S216 or S217, and if a determination is made at step S211 that α seconds have passed, the processing proceeds to step S218.

At step S218, the carriage 2011 is moved to the capping position (timing 5), the capping is conducted at step S219 (timing 6), the instruction mode is reset at step S220, and then the processing is terminated.

It should be noted that the elapsed times t, t and α seconds as above indicated can be set depending on the temperature or humidity in the atmosphere, or may be automatically set based on the detection by a sensor, e.g., a thermal sensor.

The movement to the instructed position with the control procedure as shown above can be performed while a user keeps the space key down, in which the position of the carriage 2011 relative to a recording medium, or the position of the discharge ports can be known, by using both a marker 2049 on the carriage 2011 and a scale 2047 on the paper presser bar 2045, as shown in FIG. 2 and FIG. 15. It should be noted that the position of the marker 2049 is offset from that of the discharge ports, this offset amount is prestored, and automatically corrected in the recording operation. As the scale 2047 is provided on a particular member of the ink jet recording apparatus, such as a paper presser bar 2045, it is possible to adjust the scale to the recording medium in close proximity.

Similarly, in the operation such as the movement to the instructed position, the amount of movement of the carriage 2011 can be known by using a marker 2017 on the lever as shown in FIG. 2 and FIG. 15, and a scale (not shown) indicated on a window 2008 on a cover of the device as shown in FIG. 1A.

In this way, the construction of using the markers 2049, 2017 and other scales is especially effective in returning the carriage to the interrupted position again, when the position confirming operation with the movement of carriage is interrupted due to the predischarge in the ink jet recording apparatus.

The recording method used in this invention has an excellent effect on a recording apparatus having a recording head with the ink jet recording method, especially a method in which the state change of ink is caused by the heat energy that is transferred from means for generating the energy for the discharge of ink (e.g. electricity-heat conversion element or laser beam). With such method, a higher density and definition of recording can be accomplished.

The typical construction and principle is preferably based on basic principles as disclosed in U.S. Pat. Nos. 4,723,129 and No. 4,740,796. This method is applicable to both a so-called on-demand type and a continuance type. Particularly the on-demand type is more effective because by applying at least one drive signal corresponding to a recording data and causing a rapid rise of temperature exceeding that of the nucleate boiling and, to the electricity-heat conversion element disposed corresponding to a sheet and liquid path where the liquid (ink) is carried, the heat energy is generated in the electricity-heat conversion element, and causes the film boiling on the heat acting surface of the recording head, so that bubbles in the liquid (ink) can be formed corresponding one-to-one to that drive signal. With the growth and contraction of bubbles, the liquid (ink) is discharged through discharge ports to form at least one droplet. If this drive signal is pulse-shaped, the growth or contraction of bubbles can be performed immediately and appropriately, so that the discharge of liquid (ink) is more preferably accomplished with a particularly efficient response characteristic. This pulse-shaped drive signal as described in U.S. Pat. Nos. 4,463,359 and No. 4,345,262 is appropriate. Under the conditions as described in U.S. Pat. No. 4,313,124 which is an invention concerning the temperature-rise rate of the above mentioned heat acting surface, more excellent recording can be performed.

The recording head in accordance with the present invention is constructed with the combination of discharge ports, liquid paths (straight or rectangular liquid paths) and electricity-heat conversion elements, or as described in U.S. Pat. Nos. 4,558,333 and 4,459,600, an arrangement in which the heat acting portion is disposed in an angled area. In addition, this invention is also effective with the construction based on Japanese Patent Laid-Open No. 59-123670 publication which discloses the use of a common slit as discharge portion for a plurality of electricity-heat conversion elements, or Japanese Patent Laid-open No. 59-138461 publication which discloses a construction in which an aperture absorbing the pressure wave of heat energy is disposed corresponding to the discharge portion. That is, the recording can be reliably and efficiently performed, according to the present invention, in whatever form the recording head may be made.

Furthermore, this invention is also effective for a full-line type recording head where the recording apparatus has a length corresponding to the maximum width of recording medium to be recorded. Such recording head is constructed in either a combination of a plurality of recording heads to fill that length, or an integrally formed recording head.

In addition, this invention is also effective for a serial-type recording head as above indicated, particularly, a recording head fixed to the body of apparatus, a replaceable chip type recording head which enables the electrical connection to the body of apparatus and the supply of ink from the body of apparatus because it is attached to the body of apparatus, or a cartridge type recording head integrally formed with the ink tank.

It is preferable that recovery means or preliminary auxiliary means for a recording head are added to the construction of a recording apparatus according to this invention, as it can make the effect of this invention more stable. More specifically, it includes capping means for the recording head, cleaning means, pressing or suction means, and preliminary heating means consisting of electricity-heat conversion elements or other heating elements or the combination of both. And the predischarge mode for discharging before the recording is effective to make a stable recording.

As to the type and number of recording heads to be attached, for example, a single type corresponding to a monochromatic ink, or a multiple type corresponding to a plurality of inks differing in color or density may be used. That is, the present invention is also quite effective not only for a recording apparatus having a recording mode based on a main color such as black, but also an apparatus having at least one of the composite color of different colors or the full color with mixed colors, with either an integrally formed recording head or a plurality of recording heads.

Furthermore, though the ink is considered as the liquid in the examples of the present invention as described above, it is also preferable that the ink stiffens below the room temperature and softens or liquefies at the room temperature, or as it is common in the ink jet method to control the temperature to maintain the viscosity of ink within a certain range for stably discharging with the temperature adjustment of ink in the range from 30° C. to 70° C., the ink will liquefy when a use recording signal is issued. In addition, the present invention is also applicable when the ink has the property of liquefying only with the application of the heat energy, such as the ink which liquefies with the application of heat energy in accordance with a record signal to discharge the liquid ink, or the ink which already begins to stiffen at the time when it arrives at a recording medium, with such a manner of preventing the rise of temperature with the heat energy by positively using the heat as the energy for the change of state from the solid state of ink to the liquid state, or utilizing the ink which stiffens in the shelf state in order to prevent the evaporation of ink. In this case, the ink can be provided to be opposed to electricity-heat conversion elements, in the state where the ink is carried in a recess or through hole of a porous sheet as liquid or solid material. The most effective method for each ink as above described in the present invention is a film boiling method as above indicated.

[The Entire Structure of the Information Processing Apparatus and Its Operation]

Figure 23:
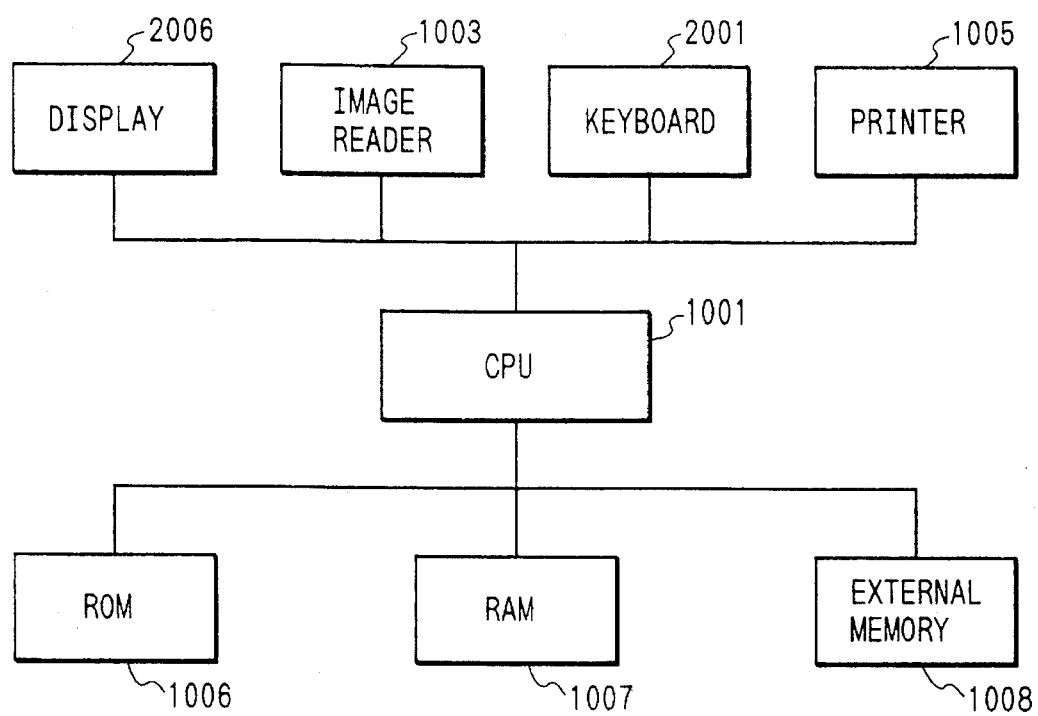
FIG. 23 is a block diagram showing an information processing apparatus according to the present invention.

FIG. 23 is a block diagram showing the structural example of an information processing apparatus according to the present invention.

Figure 22B:
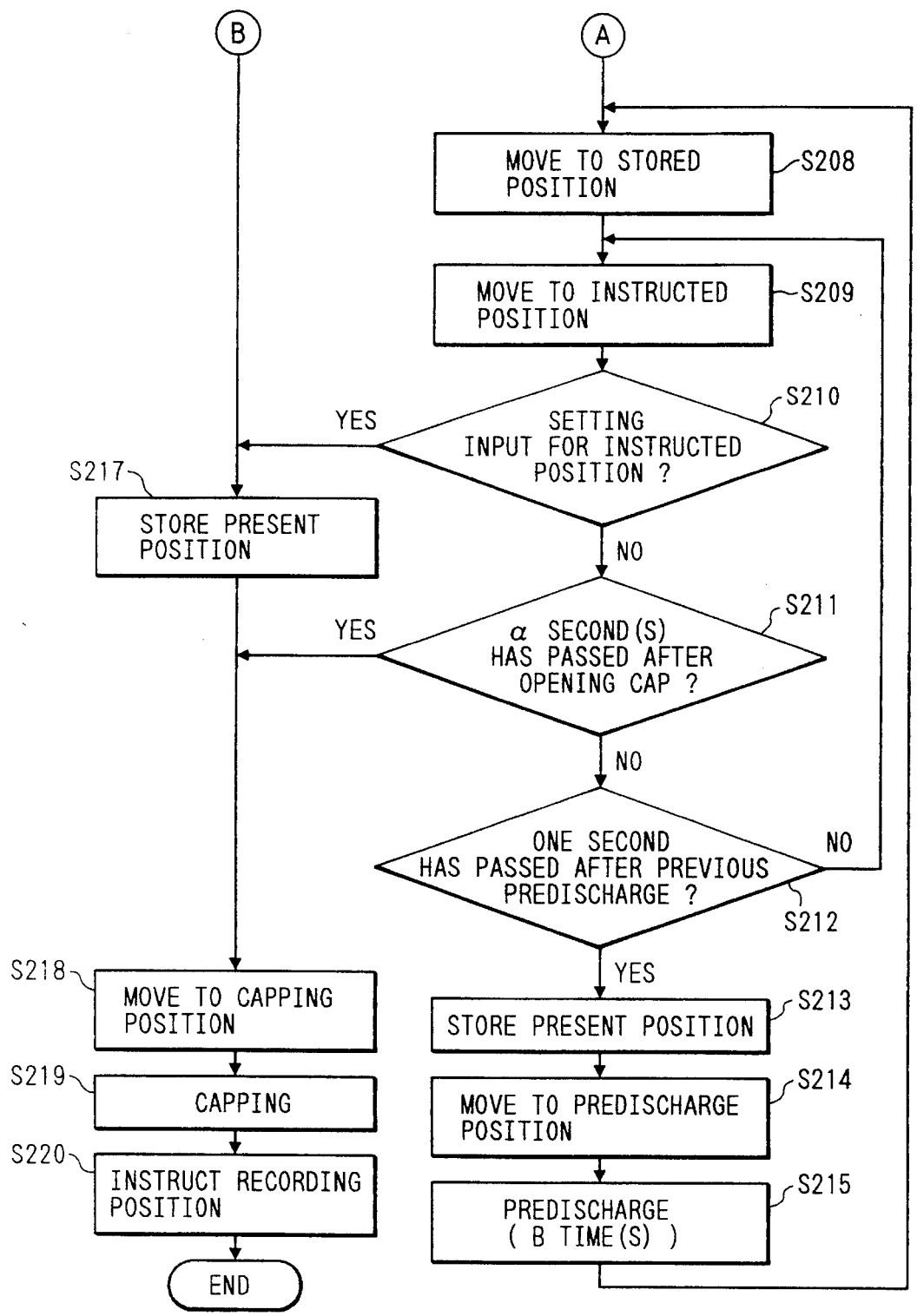
Figure 24:
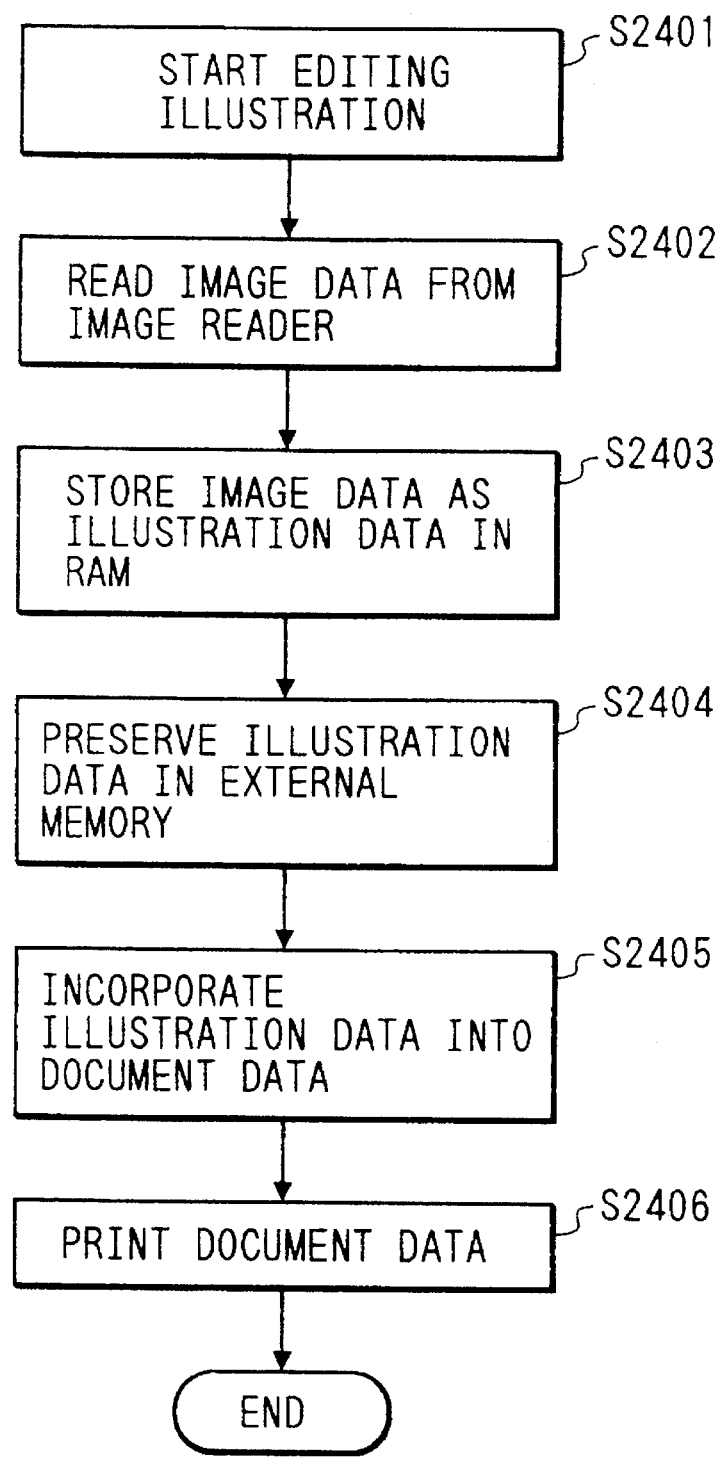
FIG. 24 is a flowchart showing the illustration editing and printing process.

In FIG. 23, a reference numeral 1001 designates a CPU (Central Processing Unit) which controls each unit through a bus line in accordance with process procedures such as shown in the flowcharts in FIGS. 22A and 22B and FIG. 24 and various programs stored in ROM (Read Only Memory) 1006.

To a bus line, a keyboard 2001 is connected for inputting characters and various instructions, and the character information inputted from this keyboard 2001 is supplied to a document memory which partially constitutes a RAM (Random Access Memory) 1007 for storage.

Also, a reference numeral 1003 is an image reader for reading printed image information for storage in the RAM 1007.

The character and image information stored in the RAM 1007 are displayed on a display 2006 through the bus line in response to the instruction given by the CPU 1001. Also, the character information and image information are printed by a printer 1005. The character and image information stored in the RAM 1007 can be saved in an external memory 1008, a FD, HD and others, for example, in the form of files.

FIG. 24 is a flowchart showing the document storing procedures for an information processing apparatus according to the present invention.

As an embodiment of the illustration editing and printing processes in this apparatus, the description will be made of the process flow with reference to FIG. 24 in a case where the image read by an image reader is saved as an illustration and output in synthesization with documentary data.

At first, the illustration editing function is actuated at the step S2401 to cause the image reader to read at the steps S2402 and S2403 an image data to be utilized for the storage in the RAM in the main body as illustration data. Then, at the step S2404, this illustration data is saved in the external memory 1008, a FD, HD, or others, in the form of a file. The illustration data thus prepared can be called to be inserted in other documentary data for synthesizing.

Next, in order to synthesize the illustration data produced and saved as set forth above or the illustration data prepared and saved by some other method such as a graphic function provided by the apparatus with the other documentary data for printing out, a desired illustration data is called from the external memory 1008 at the time of editing the documentary data to be synthesized therewith to synthesize them on the screen of the display 1002 (step S2405). Then, the documentary data produced by such synthesization is printed (step S2406).

Figure 25:
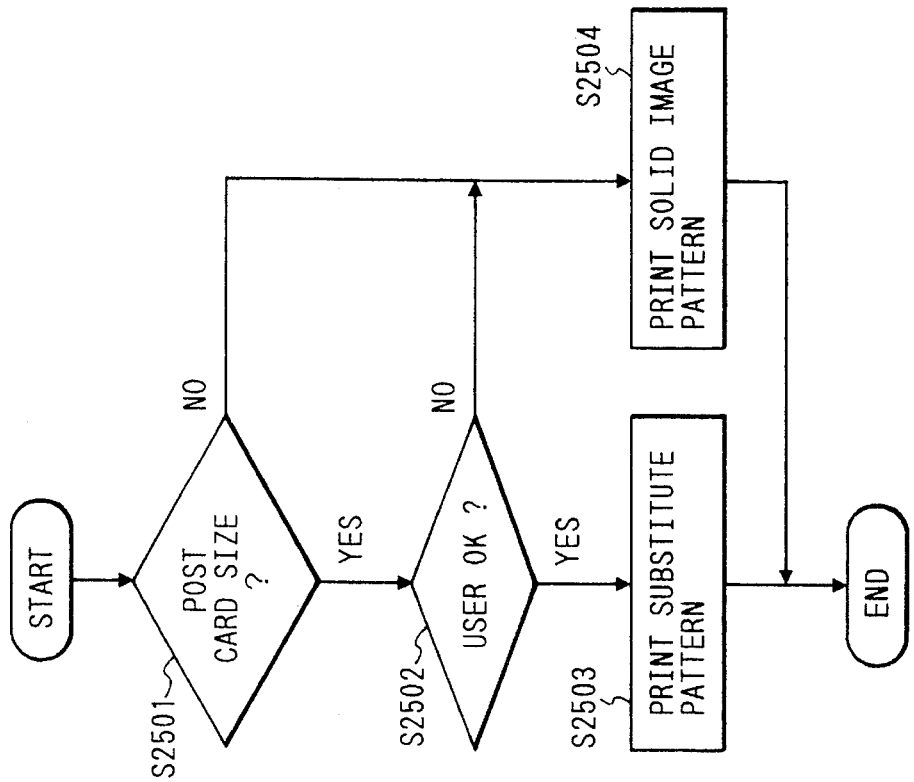
FIG. 25 is a flowchart showing the printing process enabling the utilization of a substitute pattern.

FIG. 25 is a flowchart related to a first embodiment wherein the printing is performed while improving the degradation of the printing quality due to the kind of a recording sheet. The procedures required for such process will be described in conjunction with FIG. 25.

When the printing of image and characters is started, the size of a printing sheet is judged at the step S2501 for achieving the improvement of the printing quality which is the object of the present invention. In the present embodiment, the discrimination is made so as to find whether the specified recording sheet is a post card size or not. If the size is found to be the post card size, the judgment is such that the recording sheet is a post card use and otherwise, an ordinary recording sheet.

In general, the paper used for a post card is inferior in ink fixation as compared with an ordinary recording sheet, and in the same solid printing area, there occurs portion where ink has been dried earlier. Accordingly, the ink is absorbed in such portions and the density becomes thicker while in other portions from which ink is drawn to such portion, the density becomes thinner because the amount of ink to be absorbed is reduced, thus generating the irregularity of densities. Also, this type of paper is more affected by the density irregularity, slippage, splash and the like because the ink discharging amount may vary by the high or low ambient temperature.

Here, therefore, for the purpose of effacing the density irregularity in the solid printing area to maintain the printing quality, the required process is differentiated for the kinds of papers, one for the post card and the other for the ordinary recording sheet, and such discrimination is made on the basis of the size information to define the printing conditions. At the step S2501, if the size detected is not the post card size, then the current printing sheet is judged or presumed to be an ordinary sheet. The process proceeds to the step S2504 to perform the solid printing as it is.

Subsequently, in the case of the post card printing, the user's confirmation is requested at the step S2502 as regards the process to be made at the next step S2503. At the step S2503, the printing is performed by the use of a substitute pattern (e.g., a predetermined dot pattern such as a thinning pattern) in place of the solid printing pattern, which has been prepared and saved in the FD, or the like in advance as data thereby to efface the printing defects such as the aforesaid density irregularity. To this end, an AND should be taken between the substitute pattern and the image information of the printing object, and the result thereof should be used anew as an image information for the printing object. Also, as to the image information which is used highly frequently, the standard image and the image prepared using its substitute pattern are both saved in the storage in advance, and may be selectively used in accordance with the printing conditions. The examples of the printing results by the substitute patterns are shown in FIGS. 29A and 29B.

In this respect, the process requiring the user's judgment at the step S2502 is added for obtaining the user's confirmation because the solid pattern is replaced with the substitute pattern as the current printing pattern.

Even in the case of the post card printing, if the user judges that the solid printing area is not much in the object to be printed and the ambient conditions are considered appropriate so as not to bring about a printing irregularity, the process can proceed from the step S2502 to the step S2504 to execute the printing with the solid printing pattern.

Figure 30A:
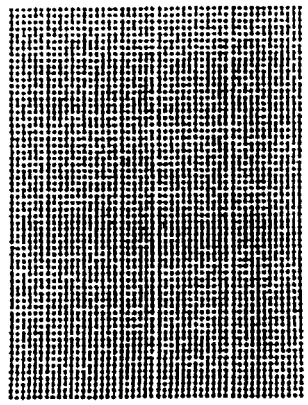
FIGS. 30A, 30B, 30C and 30D are views showing the examples of substitute patterns.
Figure 30B:
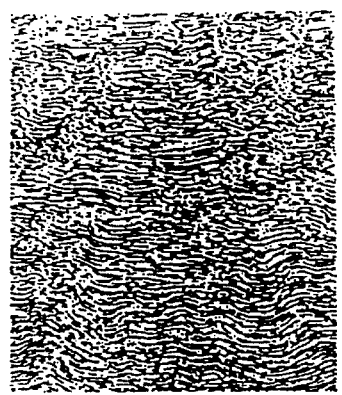
Figure 30C:
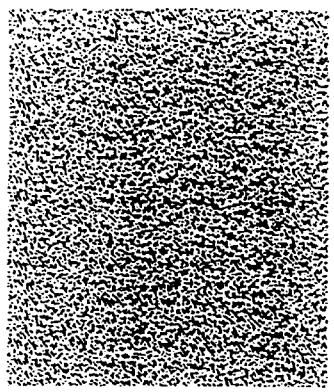
Figure 30D:
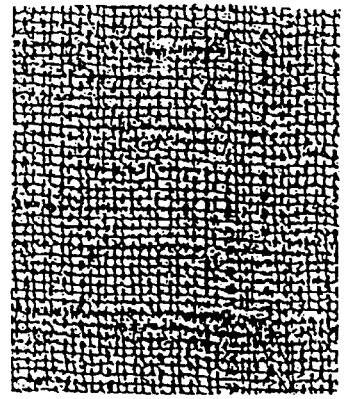

FIG. 30A through 30D show the examples of the substitute patterns, and FIGS. 30A and 30B are those used for FIGS. 29A and 29B.

Figure 26:
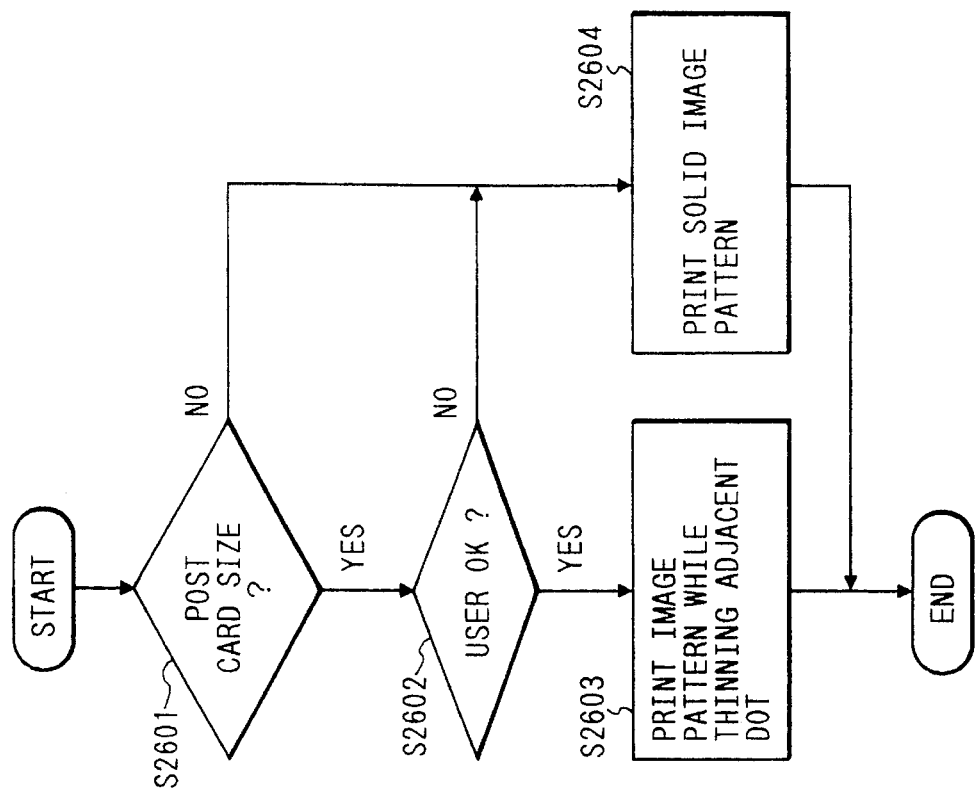
FIG. 26 is a flowchart showing the printing process enabling the utilization of a pattern thinning.

FIG. 26 is a flowchart showing another embodiment according to the present invention.

The present embodiment differs from the embodiment shown in FIG. 25 in that the portion regarding the step S2503 is changed. At the step S2503, the stored substitute pattern is read for printing, but in the present embodiment, the thinning process is automatically performed with respect to the solid printing area of an illustration or characters at the step S2603 for printing.

Also, while in the embodiment in conjunction with FIG. 25, the substitute pattern prepared for printing at the step S2503 is only one kind, the plural kinds of patterns that can be designated at the time of printing (those shown in FIGS. 30A through 30D, for example) are prepared, and the arrangement can be made so that the user may select one of them at the time of making his judgment at the step S2502 in FIG. 25 or it may be possible to arrange that in an ordinary process, one of them is selected as default value and others can be selected by special instructions. Also, it may be possible to arrange that plural kinds of substitute patterns are used in combination by performing the area designations for a same image. Likewise, in the embodiment in conjunction with FIG. 26, a plurality of thinning processes may be arranged at the step S2603 so as to allow one of them to be selected.

Also, as a condition to change the dot patterns for printing, the judgment may be made as to whether or not there are many portions which are not white in the illustration editing data called from the memory, and it may be arranged to change the dot patterns when the data has in its image many portions which are not white. For the specific method of such a change, if, for example, the object data is a black and white binarized image, a computation is executed at the time of the illustration editing data having been called to obtain the ratio of bit "1" (black) which occupys in the entire data by dividing the sum of such bits by the total bit number, and if the ratio thus obtained exceeds the predetermined reference value, then the object image is regarded as having more black portions, and the dot pattern change may be arranged to take place.

Also, in an information processing apparatus enabling connections with plural kinds of printers, the arrangements may be made so that the process in the portions regarding the above-mentioned substitute patterns can be executed only when the object printer is of ink jet type and skipped in the case of a printer of any other types in accordance with the judgment on the type or setting up of a printer to be connected which is performed preceding the selection of the above-mentioned substitute pattern process in the printing set up process at the side of the information processing apparatus.

According to the present invention set forth above, it is possible to implement a high quality printing of illustrations and others suited for the quality of papers used, ambient conditions, object printing data, and the type of object printers.

What is claimed is:

1. An information recording method for recording on materials that tend to degrade printing quality and materials that do not tend to degrade printing quality, said method comprising the steps of:

storing image information to be formed by a dot pattern and storing predetermined pattern information to be formed by a predetermined dot pattern;

instructing printing of the image information on a recording medium;

specifying a size of the recording medium;

presuming the material comprising the recording medium on the basis of the size specified in said specifying step;

judging printing conditions that tend to affect printing quality of the dot pattern, said judging including determining whether the presumed material is a material that would tend to degrade printing quality;

modifying the stored image information by changing the dot pattern which is utilized for formation of the stored image information to the predetermined dot pattern in the case where the printing conditions are judged in said judging step to tend to degrade the printing quality; and printing the modified image information on the recording medium.

2. An information recording method according to claim 1, wherein said judging is performed by processing the dot pattern of the stored image information on the basis of a specific rule.

3. An information recording method according to claim 1, wherein in said judging step, a judgement is made on a ratio of a blank portion in image information to be recorded.

4. An information recording method according to claim 1, wherein in said judging step, a judgement is made on kinds of recording means to be used in said printing step.

5. An information recording method according to claim 1, wherein in said presuming step, if a post card size is specified, the material is presumed in said presuming step as tending to degrade printing quality lower than a standard quality.

6. An information recording method according to claim 1, wherein in said modifying step modification is performed by an AND operation between the dot information utilized for the formation of the stored image information and the predetermined dot pattern.

7. An information recording method for recording on materials that tend to degrade printing quality and materials that do not tend to degrade printing quality, said method comprising the steps of:

preparing a first image formed of dots and a second image which is produced by thinning the dots forming the first image;

instructing printing of the first image on a recording medium;

specifying a size of the recording medium;

presuming the material comprising the recording medium on the basis of the size specified in said specifying step;

determining whether the presumed material is a material that would tend to degrade printing quality; and printing the second image rather than the first image, if the presumed material is determined to be the material that would tend to degrade printing quality.

8. An information recording apparatus for recording on materials that tend to degrade printing quality and materials that do not tend to degrade printing quality, said apparatus comprising:

storage means for storing image information to be formed by a dot pattern and storing predetermined pattern information to be formed by a predetermined pattern;

instruction means for instructing printing of the image information on a recording medium;

specifying means for specifying a size of the recording medium;

presuming means for presuming the material comprising the recording medium on the basis of the size specified in said specifying step;

judgement means for judging printing conditions that tend to affect printing quality of the dot pattern, said judging including determining whether the presumed material is a material that would tend to degrade printing quality;

modification means for modifying the stored image information by changing the dot pattern which is utilized for formation of the stored image information to the predetermined dot pattern in the case where the printing conditions are judged by said judgement means to tend to degrade the printing quality; and recording means for printing the modified image information on the recording medium.

9. An information recording apparatus for recording on materials that tend to degrade printing quality and materials that do not tend to degrade printing quality, said apparatus comprising:

storage means for storing a first image formed of dots and a second image which is produced by thinning the dots forming the first image;

recording means for printing at least one of the first and second images on a recording medium;

first instructing means for instructing said recording means to print the first image;

specifying means for specifying a size of the recording medium;

presuming means for presuming the material comprising the recording medium on the basis of the size specified by said specifying means;

determining means for determining whether the presumed material is a material that would tend to degrade printing quality; and second instructing means for instructing said recording means to print the second image rather than the first image, if the presumed material is determined to be the material that would tend to degrade printing quality.

* * * * *

UNITED STATES PATENT AND TRADEMARK OFFICE
CERTIFICATE OF CORRECTION

PATENT NO. : 5,504,506
DATED : April 2, 1996
INVENTOR(S) : Hiroaki NOAKI

It is certified that error appears in the above-indentified patent and that said Letters Patent is hereby corrected as shown below:

COLUMN 1:

Line 12, "an" should read --the--;

Line 13, "the" (first occurrence) should read --an--;

Line 18, "paper" should read --paper)--.

COLUMN 2:

Line 45, "illustrates" should read --illustrate--.

COLUMN 4:

Line 19, "FIG. 21B." should read --FIG. 1B.--;

Line 22, "FIG. 24B," should read --FIG. 1B,--;

Line 48, "S direction," should read --S' direction,--;

Line 65, "2009." should read --9.--.

UNITED STATES PATENT AND TRADEMARK OFFICE
CERTIFICATE OF CORRECTION

PATENT NO. : 5,504,506
DATED : April 2, 1996
INVENTOR(S) : Hiroaki NOAKI

It is certified that error appears in the above-indentified patent and that said Letters Patent is hereby corrected as shown below:

COLUMN 5:

Line 34, "thereby" should read --whereby--;
Line 35, "dusts," should read --dust,--.

COLUMN 7:

Line 55, "is" should read --are--.

COLUMN 16:

Line 17, "view-point" should read --viewpoint--.

COLUMN 17:

Line 38, "(timing" should read --(timing 3).--;
Line 56, "have" should read --has--.

COLUMN 18:

Line 42, "No." should be deleted;
Line 61, "No." should be deleted.

UNITED STATES PATENT AND TRADEMARK OFFICE
CERTIFICATE OF CORRECTION

PATENT NO. : 5,504,506  Page 3 of 3
DATED : April 2, 1996
INVENTOR(S) : Hiroaki NOAKI It is certified that error appears in the above-indentified patent and that said Letters Patent is hereby corrected as shown below:

COLUMN 22:

Line 29, "occupys in" should read --occupies--.

COLUMN 23:

Line 10, "judging" should read --judging step--;

Line 25, "step" should read --step,--.

Signed and Sealed this

Tenth Day of September, 1996

Attest:

BRUCE LEHMAN

Attesting Officer  Commissioner of Patents and Trademarks